US010983362B2

(12) United States Patent
Minamisawa

(10) Patent No.: US 10,983,362 B2
(45) Date of Patent: Apr. 20, 2021

(54) OPTICAL UNIT WITH SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 184 days.

(21) Appl. No.: 15/939,985

(22) Filed: Mar. 29, 2018

(65) Prior Publication Data
US 2018/0284477 A1  Oct. 4, 2018

(30) Foreign Application Priority Data

Mar. 30, 2017  (JP) .............................. JP2017-066746

(51) Int. Cl.
*G02B 7/02*       (2006.01)
*G02B 27/64*      (2006.01)
*G03B 5/00*       (2021.01)
*H02K 41/035*     (2006.01)
*G03B 17/02*      (2021.01)

(52) U.S. Cl.
CPC ........... *G02B 27/646* (2013.01); *G02B 7/021* (2013.01); *G03B 5/00* (2013.01); *G03B 17/02* (2013.01); *H02K 41/0356* (2013.01); *G03B 2205/0023* (2013.01); *G03B 2205/0069* (2013.01)

(58) Field of Classification Search
CPC . G02B 7/00; G02B 7/02; G02B 7/021; G02B 7/04; G02B 27/64; G02B 27/646; H04N 5/2252; H04N 5/2253; H04N 5/2254; H04N 5/2257; H04N 5/23264; H04N 5/23287; G03B 5/00; G03B 17/02; G03B 17/021
USPC .................................................. 359/813–824
See application file for complete search history.

(56) References Cited

U.S. PATENT DOCUMENTS

| 10,782,591 | B2 * | 9/2020 | Minamisawa | ............ | G02B 7/02 |
| 10,845,611 | B2 * | 11/2020 | Minamisawa | ....... | H05K 1/0274 |
| 2013/0182325 | A1 * | 7/2013 | Minamisawa | ..... | H04N 5/23248 359/554 |
| 2015/0153537 | A1 * | 6/2015 | Takano | .................... | G02B 7/08 359/824 |

(Continued)

FOREIGN PATENT DOCUMENTS

WO    2015045791 A1    4/2015

*Primary Examiner* — Thong Q Nguyen
(74) *Attorney, Agent, or Firm* — Cantor Colburn LLP

(57) ABSTRACT

An optical unit may include a movable member configured to hold an optical module; a rotation supporting mechanism to support the movable member such that the movable member rotates on an optical axis; a fixing member to support the movable member; a rolling magnetic driving mechanism to rotate the movable member on the optical axis; and an optical module flexible printed circuit board. The movable member may include a holder configured to rotate on the optical axis while holding the optical module. The holder may include a fixing part to which the optical module flexible printed circuit board is fixed. The optical module flexible printed circuit board may include a connector inserting part connected to the fixing member or to a supporting member; and a flexed part formed between the connector inserting part and a portion fixed to the fixing part.

7 Claims, 21 Drawing Sheets

(56) References Cited

U.S. PATENT DOCUMENTS

2015/0277140 A1* 10/2015 Minamisawa ......... G02B 7/026
 359/557
2019/0018258 A1* 1/2019 Minamisawa ..... H04N 5/22521

* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2017-006746 filed Mar. 30, 2017, the entire content of which is incorporated herein by reference.

BACKGROUND

Field of the Invention

At least an embodiment of the present invention relates to an optical unit with shake correction function for performing image stabilization by way of swinging or rotating an optical module provided with an optical element.

Description of the Related Documents

Some optical units, which are mounted on a cellular phone or a mobile object, include a mechanism of image stabilization, which causes an optical element to swing or rotate in order to reduce jitter in a captured image when the cellular phone or the mobile object moves. For example, the optical unit of the International Application Publication No. 2015/045791 includes a swing mechanism (i.e., a driving mechanism for image stabilization) for swinging an optical module having an optical element (i.e., an imaging element) in a pitching direction and a yawing direction in accordance with vibration in the two directions, i.e., the pitching (i.e., vertical swing/tilting) and the yawing (i.e., transverse swing/panning).

As for the optical unit of the International Application Publication No. 2015/045791, a flexible printed circuit board is connected to a movable member, which is mounted with the optical module. The swing mechanism is a magnetic driving mechanism with a magnet and a coil, and a flexible printed circuit board for feeding the coil is drawn to the back of the optical module in the optical axis direction and is flexed once into a U-shape.

As for the optical unit of the International Application Publication No. 2015/045791, in a case of providing a driving mechanism for rolling, which cause the optical module to rotate on the optical axis, the movable member rotates on the optical axis. However, with such a configuration of drawing the flexible printed circuit board as the International Application Publication No. 2015/045791, motion of the movable member is interfered due to reaction force caused by propping of the flexible printed circuit boards while rotating on the optical axis. Therefore, increase in the driving force of the driving mechanism for rolling is necessary due to the need for rotating the movable member against the reaction force caused by the flexible printed circuit boards. Therefore, increase in power consumption or in the size of the optical unit cannot be avoided due to the need for increasing the amount of power to provide to the coil or the need for upsizing the driving mechanism for rolling.

In view of the above issue, at least an embodiment of the present invention decreases reaction force caused by the flexible printed circuit boards, which are drawn between the movable member and a fixing member, when rotating the movable member on which the optical module is mounted on the optical axis to perform rolling correction.

SUMMARY OF THE INVENTION

To solve the above described issue, at least an embodiment of the present invention is characterized by: a movable member configured to hold an optical module; a rotation supporting mechanism configured to support the movable member in a manner that the movable member is able to rotate on an optical axis; a fixing member configured to support the movable member via the rotation supporting mechanism; a magnetic driving mechanism for rolling configured to allow the movable member to rotate on the optical axis; and a flexible printed circuit board for optical module which is connected to the optical module. The movable member includes a holder configured to rotate on the optical axis while holding the optical module. The holder is provided with a movable-member-side fixing part to which the flexible printed circuit board for optical module is fixed. The flexible printed circuit board for optical module includes a connector inserting part which is connected to the fixing member or to a supporting member that supports the fixing member and a flexed part which is formed between the connector inserting part and a portion that is fixed to the movable-member-side fixing part.

According to at least an embodiment of the present invention, the movable member includes the holder, which is caused to rotate on the optical axis by the magnetic driving mechanism for rolling. Further, the holder is provided with the movable-member-side fixing part to which the flexible printed circuit board for optical module is fixed. The flexible printed circuit board for optical module includes the connector inserting part which is connected to the fixing member or to the supporting member that supports the fixing member. Further, the flexed part is formed between the connector inserting part and the portion that is fixed to the movable-member-side fixing part. As described above, when performing rolling correction that involves rotation of the movable member on the optical axis, in a case where there is a flexed part on the flexible printed circuit board for optical module, which is drawn between the holder that rotates on the optical axis and the conncecter inserting part that is provided on the fixed side so as not to rotate on the optical axis, it is possible to curb occurrence of reaction force that is caused by propping of the flexible printed circuit board at the time of rolling correction. Therefore, it is possible to curb increase in power consumption because there is no need for increasing the amount of power for rotating the movable member against reaction force caused by the flexible printed circuit board for optical module.

In at least an embodiment of the present invention, the movable member includes a magnetic driving mechanism for swing configured to allow the optical module to swing on an axis crossing the optical axis; a flexible printed circuit board for swing is connected to the magnetic driving mechanism for swing; and the flexible printed circuit board for swing includes a second flexed part which is formed between a portion that is fixed to the movable-member-side fixing part and a portion that is fixed to the fixing member or to the supporting member. In the above way, it is possible to curb occurrence of reaction force caused by propping of the flexible printed circuit board for swing at the time of rolling correction. Therefore, it is possible to curb increase in power consumption because there is no need for increasing the amount of power for rotating the movable member against reaction force caused by the flexible printed circuit board for swing.

In at least an embodiment of the present invention, the flexed part is in a U-shape. Such a flexed shape enables deformation in accordance with rotation of the movable member on the optical axis. Therefore, it is possible to decrease possibility that the flexible printed circuit board for optical module props at the time of rolling correction.

In at least an embodiment of the present invention, it is possible to adopt a configuration in which the flexed part is arranged to be on an outer side of the movable member in a radial direction whose center is the optical axis. In the above way, comparing with a case where the flexed portion is arranged on the image side in the direction of the optical axis relative to the movable member, it is possible to downsize the optical unit with respect to the direction of the optical axis. Furthermore, as the flexed part becomes deformed on the outer side of the movable member with respect to the radial direction at the time of rolling correction, it is possible to decrease possibility that the flexible printed circuit board for optical module props in relation with the fixing member or the supporting member arranged on the outer side of the movable member with respect to the radial direction.

In at least an embodiment of the present invention, it is possible to adopt a configuration in which the flexed part is arranged to be on an image side in a direction of the optical axis relative to the movable member. For example, in a case where a counterpart member, to which the connecter part of the flexible printed circuit board for optical module is connected, is arranged on the image side in the direction of the optical axis relative to the movable member, it is possible to arrange the flexed part on the image side in the direction of the optical axis relative to the movable member so as to decrease possibility that the flexible printed circuit board for optical module props at the time of rolling correction.

In this case, that the holder includes a restraint wall that protrudes toward the image side in the direction of the optical axis, the restraint wall being on an outer side of the movable-member-side fixing part in a radial direction. As the flexible printed circuit board for optical module, which is fixed to the movable-member-side fixing part, is directed toward the image side in the direction of the optical axis upon abutting against the restraint wall, it follows that, by flexing this portion, it is possible to form a flexed part on the flexible printed circuit board for optical module on the image side with respect to the direction of the optical axis relative to the movable member. Furthermore, as the flexible printed circuit board is supported by the restraint wall, it is possible to make arrangement such that excessive force is not imposed on the flexible printed circuit board for optical module.

In this case, that the flexed part is in a U-shape that is open toward an outer side in a radial direction and includes a folded part arranged on the optical axis. As described above, in a case of such a U-shape including a folded part arranged on the optical axis, parts of the flexible printed circuit board for optical module can be oriented in different directions, respectively, with the center being at the folded part. Therefore, it is possible to reduce possibility that the flexible printed circuit board for optical module props at the time of rolling correction.

In at least an embodiment of the present invention, it is possible to adopt a configuration in which: the magnetic driving mechanism for rolling includes a coil that is fixed to the movable member and a magnet that is fixed to the fixing member; a flexible printed circuit board for rolling is connected to the coil; and the flexible printed circuit board for rolling includes a third flexed part which is formed between a portion that is fixed to the movable-member-side fixing part and a portion that is fixed to the fixing member or to the supporting member. In the above way, it is possible to curb occurrence of reaction force caused by propping of the flexible printed circuit board for rolling at the time of rolling correction. Therefore, it is possible to curb increase in power consumption because there is no need for increasing the amount of power for rotating the movable member against reaction force caused by the flexible printed circuit board for rolling.

Alternatively, in at least an embodiment of the present invention, it is possible to adopt a configuration in which: the magnetic driving mechanism for rolling includes a magnet that is fixed to the movable member and a coil that is fixed to the fixing member; and a flexible printed circuit board for rolling is connected to the coil. In the above way, the flexible printed circuit board for rolling is easily manufactured because there is no need for connecting the flexible printed circuit board for rolling to the movable member. Furthermore, it is possible to prevent the flexible printed circuit board for rolling from propping at the time of rolling correction.

According to at least an embodiment of the present invention, when performing rolling correction that involves rotation of the movable member on the optical axis, there is a flexed part on the flexible printed circuit board for optical module, which is drawn between the movable-member-side fixing part, which is provided on the holder that rotates on the optical axis, and the connecter part, which is connected to a position that does not rotate on the optical axis. Therefore, it is possible to curb occurrence of reaction force caused by propping of the flexible printed circuit board for optical module at the time of rolling correction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, an embodiment of an optical unit 1 to which at least an embodiment of the present invention is applied is explained with reference to the drawings. In the present specification, directions of three axes X, Y and Z are at right angles to each other. Further, one side of the X axis direction is indicated by +X and the other side is indicated by −X. Further, one side of the Y axis direction is indicated by +Y and the other side is indicated by −Y. Further, one side of the Z axis direction is indicated by +X and the other side is indicated by −Z. The axis L of the optical unit 1 corresponds to the optical axis of the optical unit 1. The Z axis direction corresponds to the axis L direction (i.e., the optical axis direction) of the optical unit 1. Furthermore, the −Z direction is a counter-object side (i.e., an image side) of the axis L direction (i.e., the optical axis direction) and the +Z direction is an object side of the axis L direction (i.e., the optical axis direction).

(Entire Configuration)

Figure 1:
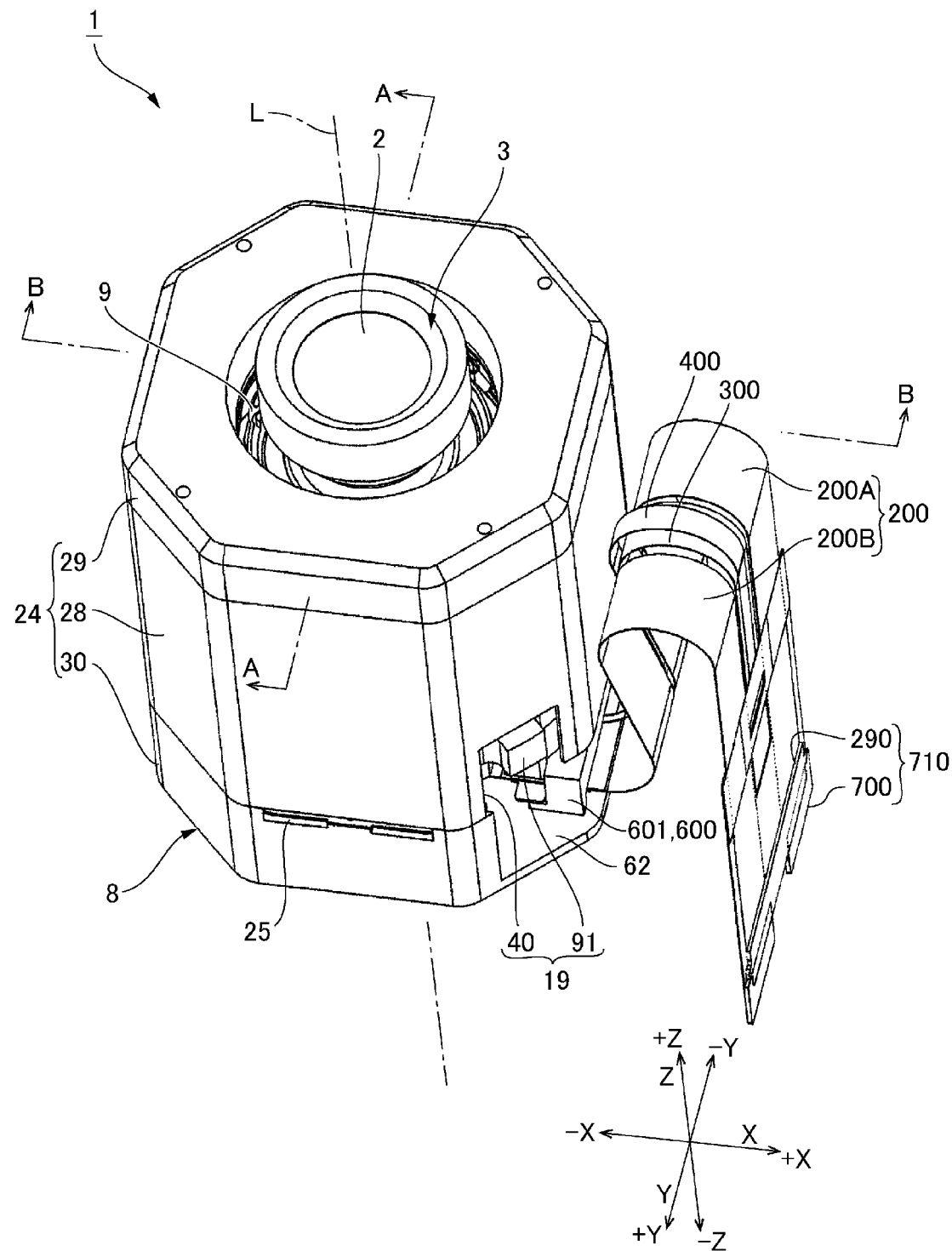
FIG. 1 is a perspective view of an optical unit to which at least an embodiment of the present invention is applied, when seen from an object side.
Figure 2:
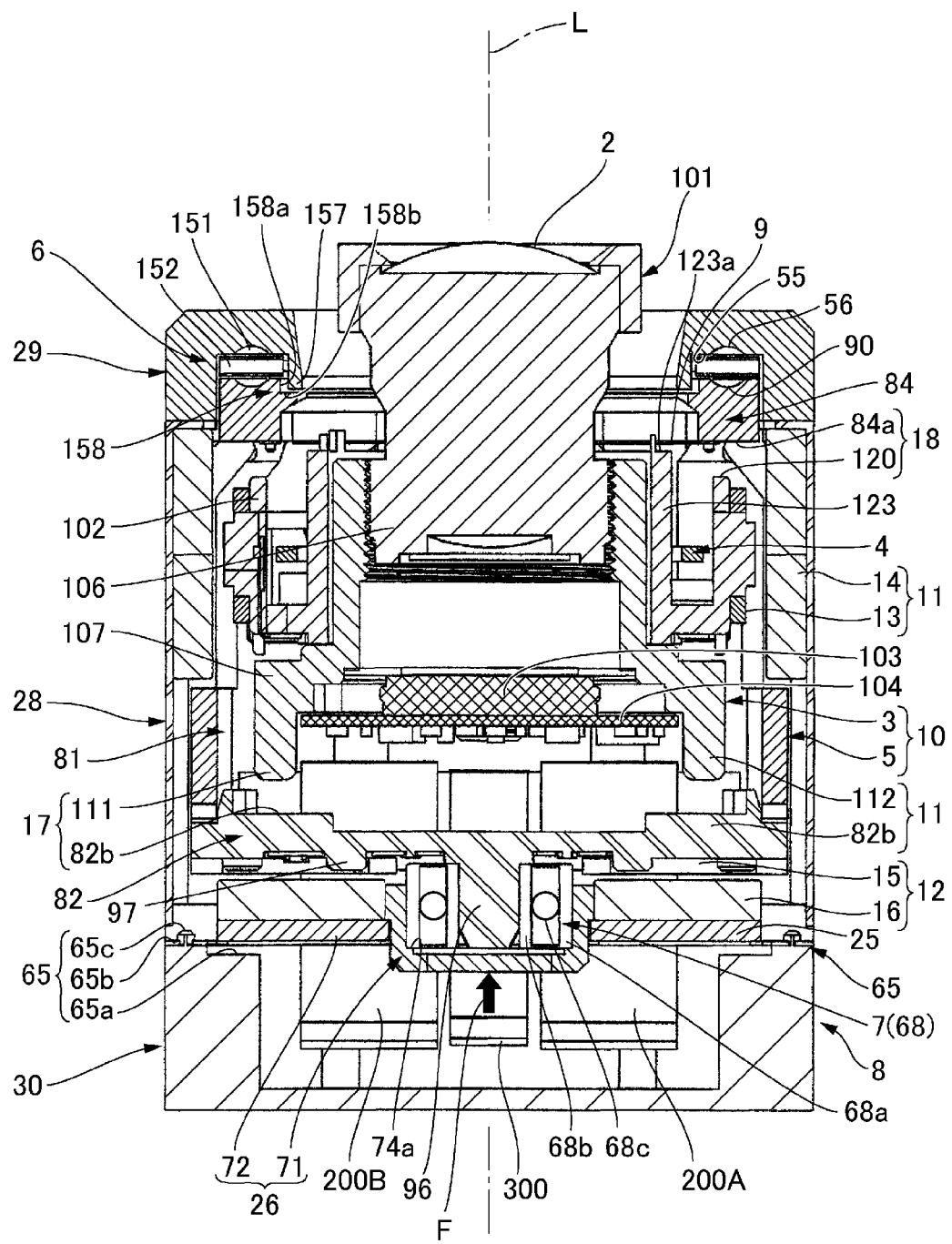
FIG. 2 is a sectional view of the optical unit taken along a line A-A of FIG. 1.
Figure 2:
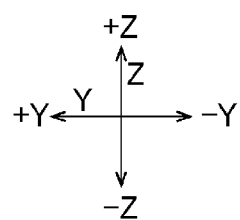
Figure 3:
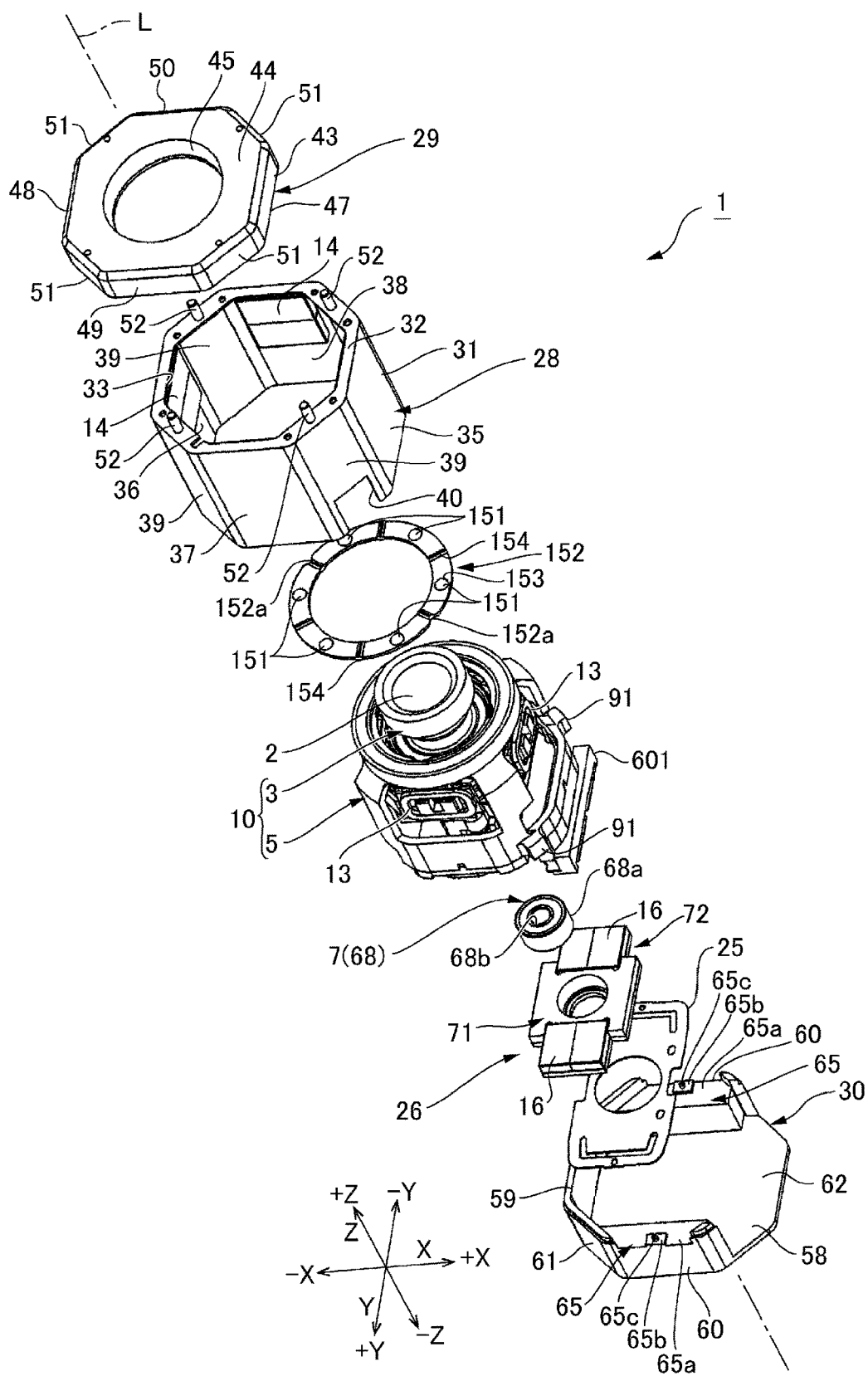
FIG. 3 is an exploded perspective view of the optical unit of FIG. 1, when seen from the object side.
Figure 4:
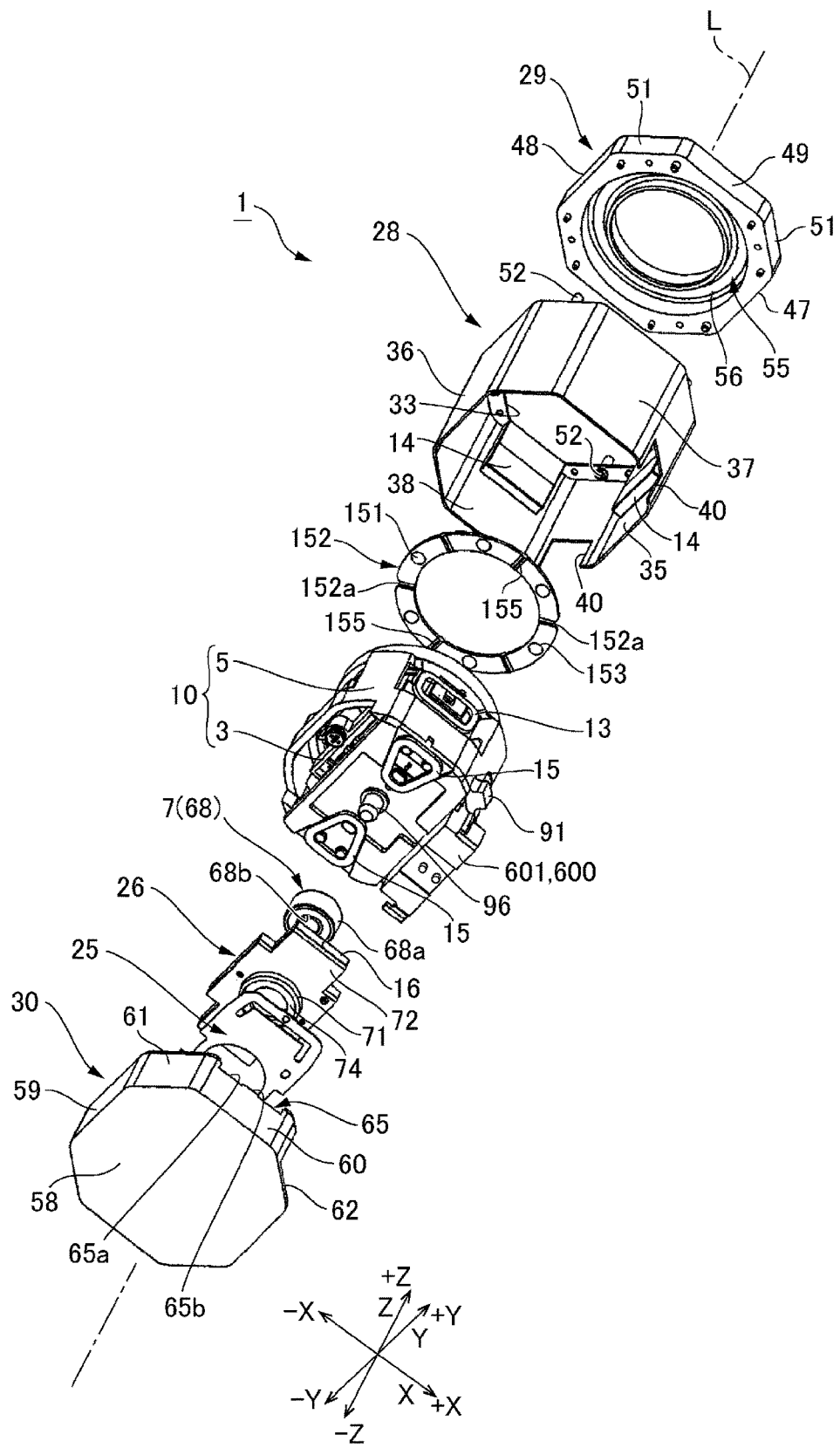
FIG. 4 is an exploded perspective view of the optical unit of FIG. 1, when seen from a counter-object side.

FIG. 1 is a perspective view of the optical unit 1 to which at least an embodiment of the present invention is applied, when seen from the object side. FIG. 2 is a sectional view of the optical unit 1 taken along the line A-A of FIG. 1. FIG. 3 is an exploded perspective view of the optical unit 1 of FIG. 1, when seen from the object side. FIG. 4 is an exploded perspective view of the optical unit 1 of FIG. 1, when seen from the counter-object side (i.e., the image side). For example, the optical unit 1 shown in FIG. 1 is employed for an optical device such as a cellular phone device with camera or a drive recorder, or for an optical device such as an action camera or a wearable camera mounted on a mobile object such as a helmet, a bicycle or a radio control helicopter. With such an optical device, vibration of the optical device 1 when capturing an image causes occurrence of jitter in the captured image. The optical unit 1 is an optical unit provided with shake correction function for correcting tilt of an optical element 2 so as to prevent a captured image from tilting.

As shown in FIG. 2, the optical unit 1 is provided with: a swing member 3 mounted with a camera module 101 provided with an optical element 2; a swing supporting mechanism 4 for supporting the swing member 3 such that the swing member 3 can swing; and a holder 5 for supporting the swing member 3 via the swing supporting mechanism 4. Furthermore, the optical unit 1 is provided with: a first rotation supporting mechanism 6 and a second rotation supporting mechanism 7 for supporting the holder 5 such that the holder 5 can rotate; and a fixing member 8 for supporting the holder 5 via the first rotation supporting mechanism 6 and the second rotation supporting mechanism 7. Furthermore, the optical unit 1 is provided with a plate spring 9 that is overhung between the swing member 3 and the holder 5.

The swing supporting mechanism 4 supports the swing member 3 such that the swing member 3 can swing in a range between a reference posture, in which a predetermined axis L corresponds to the optical axis of the optical element 2, and a tilting posture, in which the optical axis tilts relative to the axis L. The swing supporting mechanism 4 has a gimbal mechanism. The first rotation supporting mechanism 6 and the second rotation supporting mechanism 7 support the holder 5 such that the holder 5 can rotate on the axis L. In other words, the first rotation supporting mechanism 6 and the second rotation supporting mechanism 7 support a movable member 10, which includes the holder 5 and the swing member 3 that is supported by the holder 5 so as to be able to swing, such that the movable member 10 can rotate on the axis L. The first rotation supporting mechanism 6 is configured between the fixing member 8 and the holder 5. The second rotation supporting mechanism 7 is positioned in the −Z direction (i.e., on the counter-object side) relative to the first rotation supporting mechanism 6. The plate spring 9 is provided for defining the reference posture of the swing member 3.

Furthermore, the optical unit 1 is provided with a magnetic driving mechanism for swing 11 for swinging the swing member 3; and a magnetic drive mechanism for rolling 12 for rotating the holder 5 (i.e., the movable member 10). The magnetic driving mechanism for swing 11 is provided with: a swinging drive coil 13 that is held by the swing member 3; and a swinging drive magnet 14 that is held by the fixing member 8. The swinging drive coil 13 and the swinging drive magnet 14 are opposed to each other in a radial direction, which is at right angle to the axis L. The magnetic drive mechanism for rolling 12 is provided with: a rolling drive coil 15 that is held by the holder 5; and a rolling drive magnet 16 that is held by the fixing member 8. In the present embodiment, the rolling drive coil 15 and the rolling drive magnet 16 are opposed to each other in the Z axis direction (i.e., the axis L direction).

As shown in FIG. 1, the optical unit 1 is provided with flexible printed circuit boards 200, 300 and 400. Note that, in FIGS. 2 through 10, illustration of the flexible printed circuit boards 200, 300 and 400 is omitted. The flexible printed circuit board 200 (i.e., a flexible printed circuit board for optical module) is connected to the camera module 101. The flexible printed circuit board 200 is provided with: a feeder wire for the camera module 101; and a signal wire for externally taking signals from the camera module 101. Furthermore, the flexible printed circuit board 300 (i.e., flexible printed circuit board for swing) is connected to the magnetic driving mechanism for swing 11. The flexible printed circuit board 300 is provided with a feeder wire for feeding the swinging drive coil 13. Furthermore, the flexible printed circuit board 400 (i.e., flexible printed circuit board for rolling) is connected to the magnetic drive mechanism for rolling 12. The flexible printed circuit board 400 is provided with a feeder wire for feeding the rolling drive coil 15.

(Fixing Member)

As shown in FIG. 1, FIG. 3, and FIG. 4, the fixing member 8 includes: a fixing member main body 24 configured by assembling three casing 28, 29 and 30; a plate spring 25 (i.e., a spring member) that is fixed to the fixing member main body 24; and a movable holder 26 that is supported by the fixing member main body 24 via the plate spring 25. The movable holder 26 is supported such that the movable holder 26 can move in the Z axis direction. As shown in FIG. 1, the fixing member main body 24 is provided with: a cylindrical casing 28, which is externally in a substantially octagonal shape when seen from the Z axis direction (i.e., the axis direction); an object-side casing 29 that is attached to the cylindrical casing 28 from the +Z direction (i.e., an object side); and a counter-object-side casing 30 that is attached to the cylindrical casing 28 from the −Z direction (i.e., a counter-object side). The cylindrical casing 28 is formed of magnetic material. The object-side casing 29 and the counter-object-side casing 30 are formed of resin material.

As shown in FIG. 3, the cylindrical casing 28 is provided with: a cylindrical body part 31, which is in a substantially octagonal shape; and a frame-shaped end plate part 32, which internally extends from the end part of the body part 31 with respect to the +Z direction. In the center of the end plate part 32, a substantially octagonal aperture part 33 is formed. The body part 31 is provided with: side plates 35 and 36, which are opposed to each other in the X axis direction; side plates 37 and 38, which are opposed to each other in the Y axis direction; and side plates 39 provided at four corners, each of which faces diagonally at 45 degrees relative to the X axis direction and the Y axis direction. As shown in FIG. 3 and FIG. 4, swinging drive magnets 14 are respectively fixed to the inner circumferential surfaces of the side plates 35 and 36, which are opposed to each other in the X axis direction, and the side plates 37 and 38, which are opposed to each other in the Y axis direction. In addition, as shown in FIG. 4, among the four side plates 39, on the two side plates 39 that are positioned in the +X direction, rectangular cutout parts 40 are respectively formed. Each of the cutout parts 40 is in a shape formed by cutting out, in the +Z direction, an end edge of a side plate 39 with respect to the −Z direction.

The object-side casing 29 is provided with: a cylindrical body part 43, which abuts against the end plate part 32 of the cylindrical casing 28; and an end plate part 44, which internally extends from the end part of the body part 43 with respect to the +Z direction. In the center of the end plate part 44, a circular aperture part 45 is formed. As shown in FIG. 4, the inner circumferential surface of the body part 43 is in a substantially circular shape, and the outer circumferential surface is in a substantially octagonal shape when seen in the Z axis direction. The outer circumferential surface of the body part 43 is provided with: side surfaces 47 and 48, which are opposed to each other in the X axis direction; side surfaces 49 and 50, which are opposed to each other in the Y axis direction; and side surfaces 51 provided at four corners, each of which faces diagonally at 45 degrees relative to the X axis direction and the Y axis direction. The object-side casing 29 is fixed to the cylindrical casing 28 by use of four screws 52 with head, each of which is screwed through the end plate part 32 of the cylindrical casing 28 from the −Z direction to the body part 43. Here, the surface of the end plate part 44 with respect to the −Z direction is an annular surface coaxial with the axis L, and is a fixing-member-side opposing part 55 that corresponds to the holder 5 in the Z axis direction. On the fixing side opposing part 55, a fixing-member-side annular groove 56 is provided. The fixing-member-side annular groove 56 is coaxial with the axis L and has an arc cross-sectional shape.

As shown in FIG. 3, the counter-object-side casing 30 is provided with: an end plate part 58, which is in a substantially octagonal shape and is at right angle to the axis L; a wall part 59 rising in the +Z direction from the end edge (i.e., the edge) of the end plate part 58 with respect to the −X direction; two wall parts 60 rising in the +Z direction from end edges (i.e., edges) of the end plate part 58 with respect to the −Y direction and the +Y direction, respectively, such that the two wall parts 60 are opposed to each other in the Y axis direction; and two wall parts 61, which are positioned between the wall part 59 and respective one of the two wall parts 60 such that the two wall parts 61 respectively face diagonally at 45 degrees relative to the X axis direction and the Y axis direction. Here, wall parts are not provided at the end edge (i.e., the edge) of the end plate part 58 with respect to the +X direction, and therefore there is an aperture part 62 on the edge with respect to the −X direction, which is between the two wall parts 60 that are opposed to each other in the Y axis direction. As shown in FIG. 1, the aperture part 62 is an outlet for drawing out the flexible printed circuit boards 200, 300 and 400.

At end portions with respect to the +Z direction of the two wall parts 60, which are opposed to each other in the Y axis direction, there are provided plate spring fixing parts 65 for respectively fixing both end portions of the plate spring 25 with respect to the Y direction. Each plate spring fixing part 65 is provided with: an end surface 65a, which extends in the X axis direction and the Y axis direction at a level that is offset in the −Z direction relative to the top end of the wall part 59; a rectangular projection part 65b, which is formed at an edge portion on the outer circumferential side of the end surface 65a; and a circular projection 65c, that protrudes in the +Z direction from the center of the rectangular projection part 65b.

Figure 5:
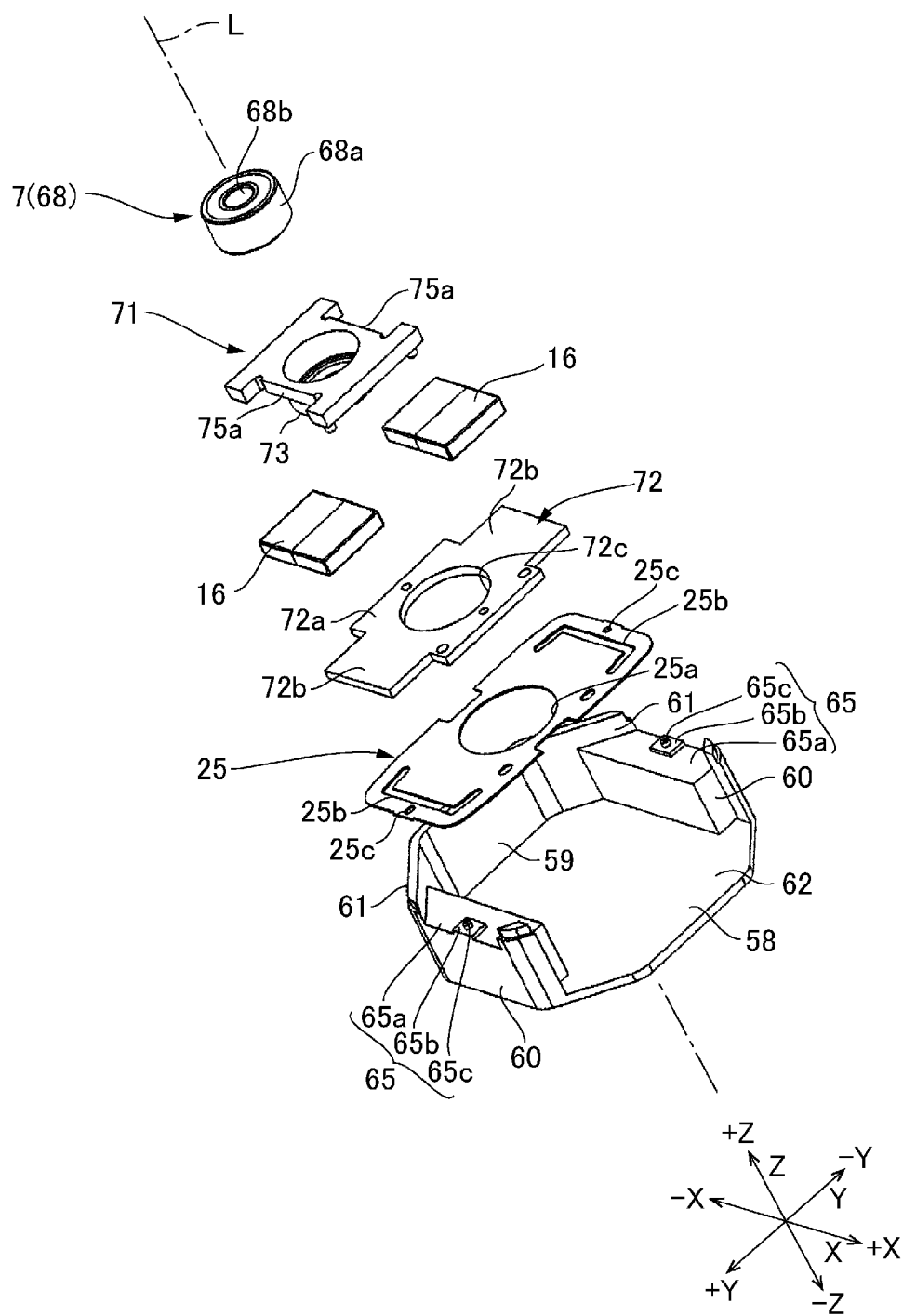
FIG. 5 is an exploded perspective view of counter-object-side portions of a fixing member.

FIG. 5 is an exploded perspective view of counter-object-side portions (i.e., the second rotation supporting mechanism 7, the movable holder 26, the plate spring 25, and the counter-object-side casing 30) of the fixing member 8. As shown in FIG. 5, the movable holder 26 is provided with: an outer ring 68a of a ball bearing 68, which configures the second rotation supporting mechanism 7; and a movable holder main body member 71 for holding two rolling drive magnets 16. The movable holder main body member 71 is provided with a cylinder part 73 with which the outer ring 68a is engaged. The two rolling drive magnets 16 are respectively engaged from the outer circumferential side into depression parts 75a, which are formed on both sides of the movable holder main body member 71 with respect to the Y axis direction, such that the two rolling drive magnets 16 are held by the movable holder main body member 71. Furthermore, the movable holder 26 is provided with a yoke 72 that abuts against the movable holder main body member 71 from the −Z direction. As for the yoke 72, adhesive agent is applied to portions which are abutted by the rolling drive magnets 16, such that the rolling drive magnets 16 are fixed to the yoke 72 as well.

The plate spring 25 has a substantially rectangular contour shape that is elongated in the Y axis direction. At the center with respect to the Y axis direction, the plate spring 25 has a through hole 25a through which the cylinder part 73 of the movable holder main body member 71 can be inserted. In addition, the plate spring 25 has U-shaped slits 25b respectively on both sides with respect to the Y axis direction with the through hole 25a therebetween. The two slits 25b have such shapes that the two slits 25b frame end portions of the yoke 72 with respect to the Y axis direction, when the yoke 72 and the plate spring 25 are overlapped. In addition, the plate spring 25 has fixing holes 25c for fixing the plate spring 25 to the spring fixing parts 65, respectively, at both end portions with respect to the Y axis direction (i.e., outside of the two slits 25b with respect to the Y axis direction).

The plate spring 25 is supported by the plate spring fixing part 65 such that the projections 65c are inserted into the fixing holes 25c and the center portions at both end portions with respect to the Y axis direction are placed on the projection parts 65b. In addition, as shown in FIG. 1, when the cylindrical casing 28 and the counter-object-side casing 30 are assembled, the plate spring 25 is thereby nipped between the cylindrical casing 28 and the counter-object-side casing 30 to be fixed to the fixing member 8. Here, as shown in FIG. 2, when the movable holder 26 is supported by the fixing member 8, the plate spring 25 imparts biasing force F to bias the movable holder 26 in the +Z axis direction (i.e., object side). That is, as for the plate spring 25, the portion inside both end portions with respect to the Y axis direction, which are fixed to the plate spring fixing parts 65, is flexed in the −Z direction (i.e., counter-object side). Therefore, due to elastic recovery force, the movable holder 26 is biased in the +Z direction.

(Holder)

Figure 6:
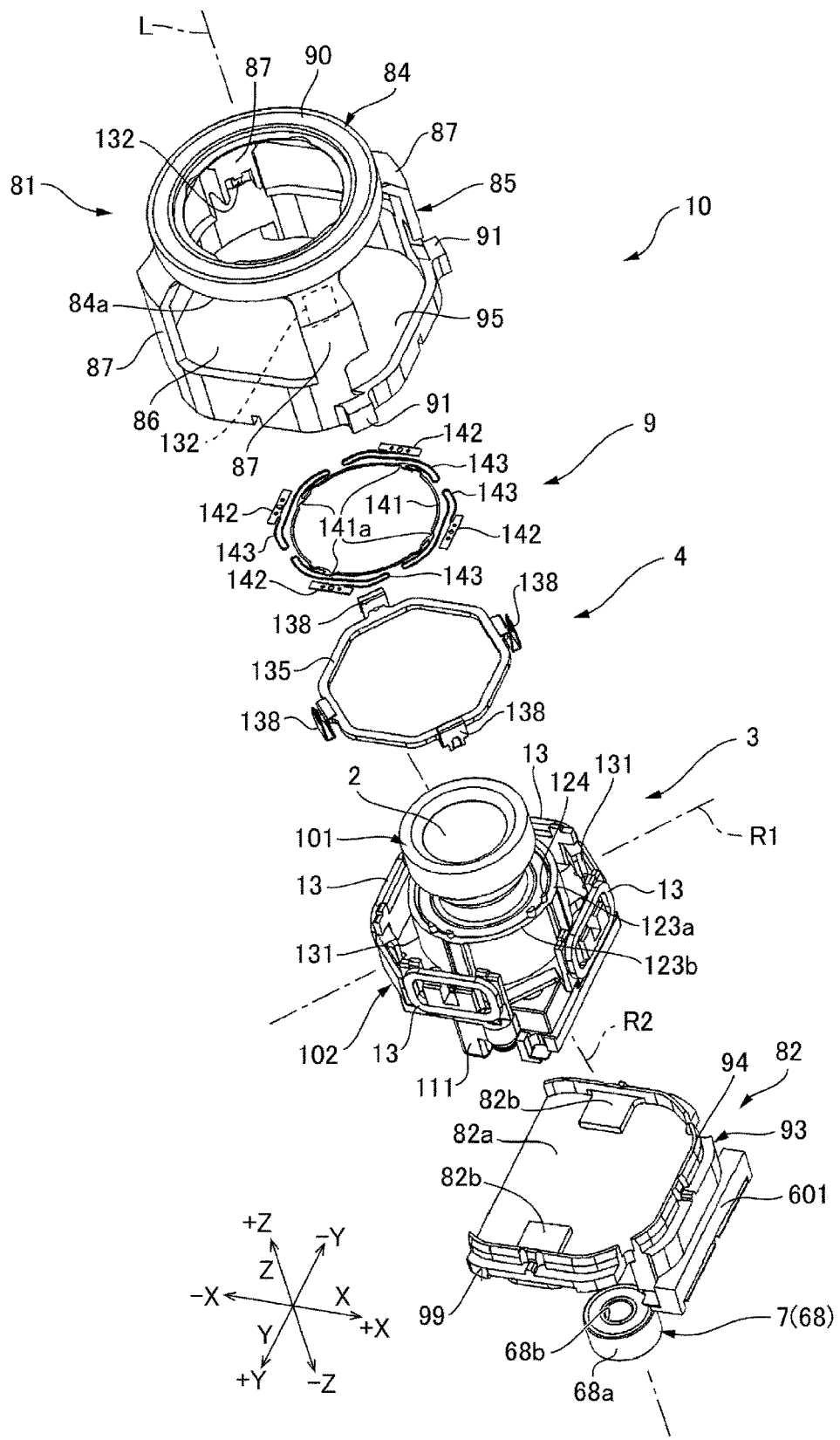
FIG. 6 is an exploded perspective view of a movable member and a holder, when seen from the object side.
Figure 7:
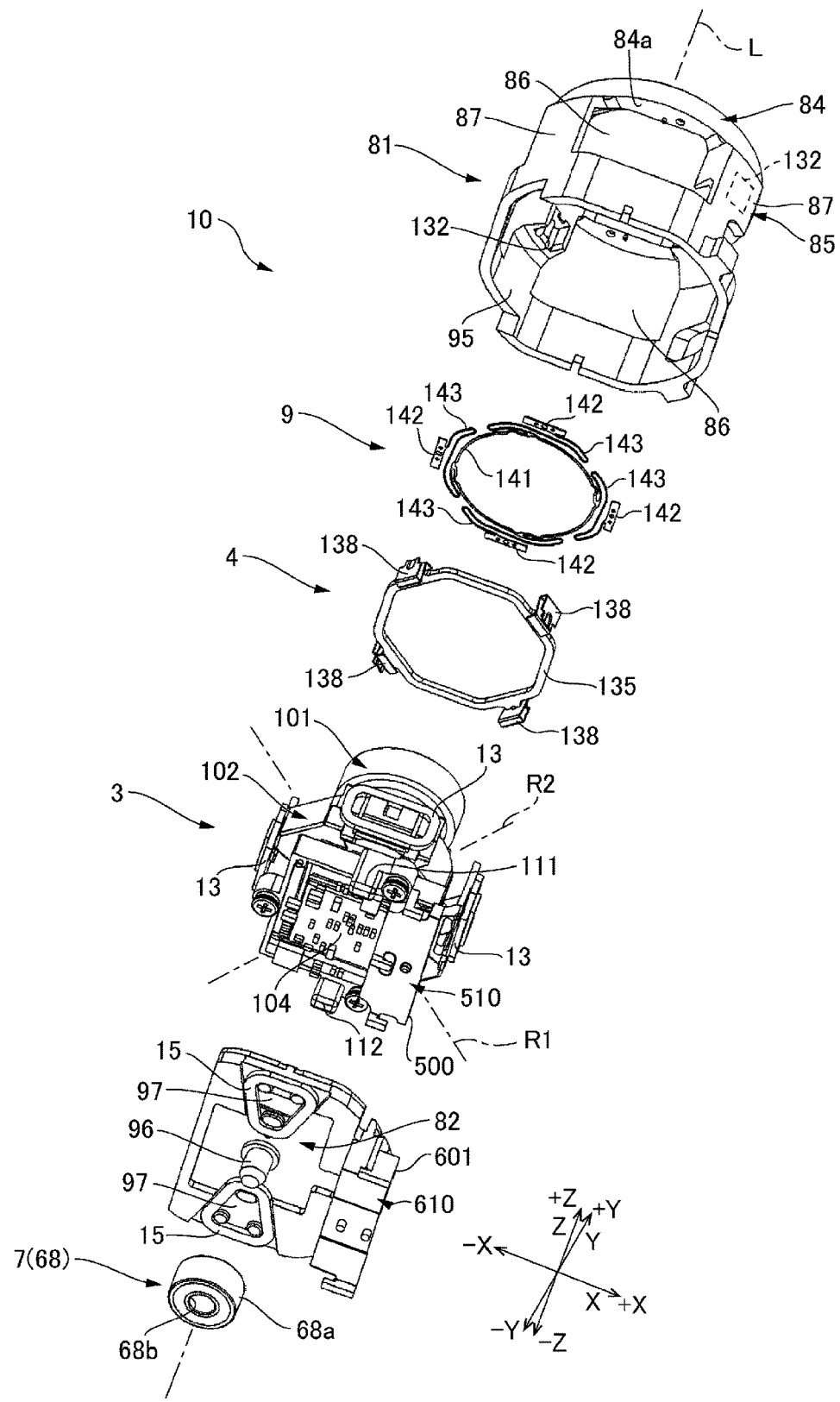
FIG. 7 is an exploded perspective view of the movable member and the holder, when seen from the counter-object side.

FIG. 6 is an exploded perspective view of the movable member 10, which is configured with the swing member 3 and the holder 5, when seen from the +Z direction. FIG. 7 is an exploded perspective view of the movable member 10, which is configured with the swing member 3 and the holder 5, when seen from the −Z direction. As shown in FIG. 6, the holder 5 is provided with: a holder main body member 81, which is positioned on the outer circumferential side of the swing member 3; and a holder bottom plate member 82, which is fixed to the holder main body member 81 from the −Z direction such that the holder bottom plate member 82 is opposed to the swing member 3. The holder main body member 81 and the holder bottom plate member 82 are made of resin.

As shown in FIG. 6, the holder main body member 81 is provided with: an annular holder-side opposing part 84 (i.e., supporting-member-side opposing part), which is opposed to the annular fixing-member-side opposing part 55 of the fixing member 8 (i.e., the object-side casing 29), at the end part with respect to the −Z direction; and a holder body part 85 that is continuous toward the −Z direction from the holder-side opposing part 84. The holder body part 85 is provided with: four window parts 86, which are arranged in a circumferential direction; and four longitudinal frame parts 87 for partitioning to create the window parts 86 arranged side by side in the circumferential direction. Two of the four window parts 86 are open in the X axis direction, and the other two are open in the Y axis direction. The four longitudinal frame parts 87 are positioned at angles between the X axis direction and the Y axis direction, respectively.

As for the holder-side opposing part 84, the end surface with respect to the +Z direction is an annular surface orthogonal to the axis L. Further, a holder-side annular groove 90 (i.e., a supporting-member-side annular groove) is provided on the annular face. The holder-side annular groove 90 is opposed in the Z axis direction to the fixing-member-side annular groove 56, which is provided in the holder-side opposing part 84. The holder-side annular groove 90 is coaxial with the axis L and has an arc cross-sectional shape. The holder-side opposing part 84 is provided with an annular end surface 84a that is orthogonal to the axis L and faces in the −Z direction.

At the end portion of the holder body part 85 with respect to the −Z direction, there are provided a projection 91 that protrudes in a direction between the +X direction and the +Y direction and a projection 91 that protrudes in a direction between the −X direction and the −Y direction. The projections 91 are arranged for the cutout parts 40 formed on the side plates 39 of the cylindrical casing 28 (i.e., the fixing member 8). The holder 5 rotates on the axis L in a range where the projections 91 can move inside the cutout parts 40 in the circumferential direction. That is, the projections 91 and the cutout parts 40 configure a stopper mechanism 19 (see FIG. 1) for restraining a rotation range where the movable member 10 rotates on the axis L relative to the fixing member 8.

The holder bottom plate member 82 includes an opposing surface 82a, which is orthogonal to the axis L and is opposed to the swing member 3 from the −Z direction. At both end portions of the opposing surface 82a with respect to the Y axis direction, there are respectively provided rectangular projection portions 82b that project in the +Z direction. On the outer circumferential edge of the opposing surface 82a of the holder bottom plate member 82, there is provided a stepped part 93 that surrounds the bottom plate from both sides with respect to the Y axis direction and from the +X direction. The stepped part 93 includes an annular projection part 94, which projects in the +Z direction, on the inner circumferential side. When the holder bottom plate member 82 is fixed to the holder main body member 81, the annular projection part 94 is internally engaged with an aperture part 95 of the holder main body member 81 (i.e., the holder body part 85), which is open in the −Z direction.

Furthermore, as shown in FIG. 7, the holder bottom plate member 82 is provided with a shaft part 96, which protrudes in the −Z direction. The shaft part 96 is provided so as to be coaxial with the axis L. The shaft part 96 is configured to hold, on the outer circumferential side, the inner ring 68b of the ball bearing 68. The end surface of the inner ring 68b with respect to the +Z direction abuts against the holder bottom plate member 82. Furthermore, the holder bottom plate member 82 is provided with rolling drive coil holding parts 97 on both sides with respect to the Y axis direction with the shaft part 96 therebetween. The rolling drive coils 15 are held by the rolling drive coil holding parts 97 from the −Z direction.

Swing Member

Figure 8:
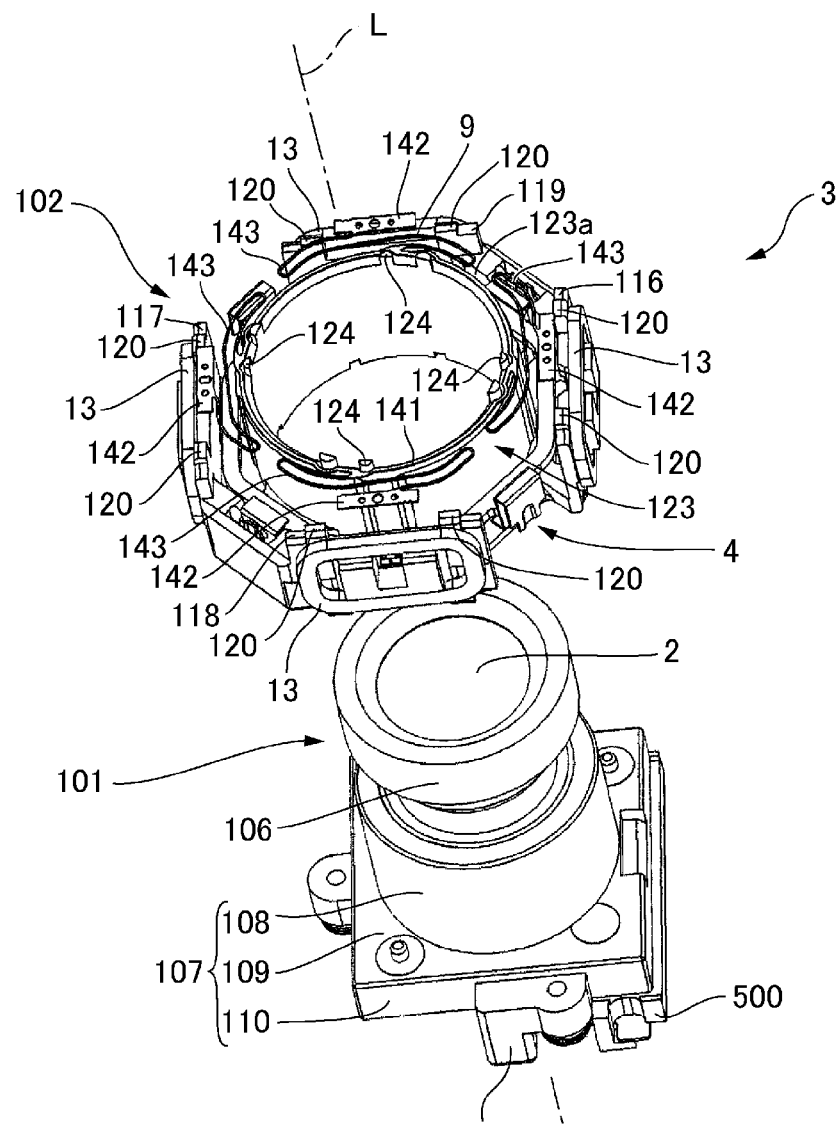
FIG. 8 is an exploded perspective view of the movable member, when seen from the object side.
Figure 8:
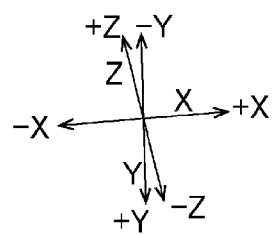
Figure 9:
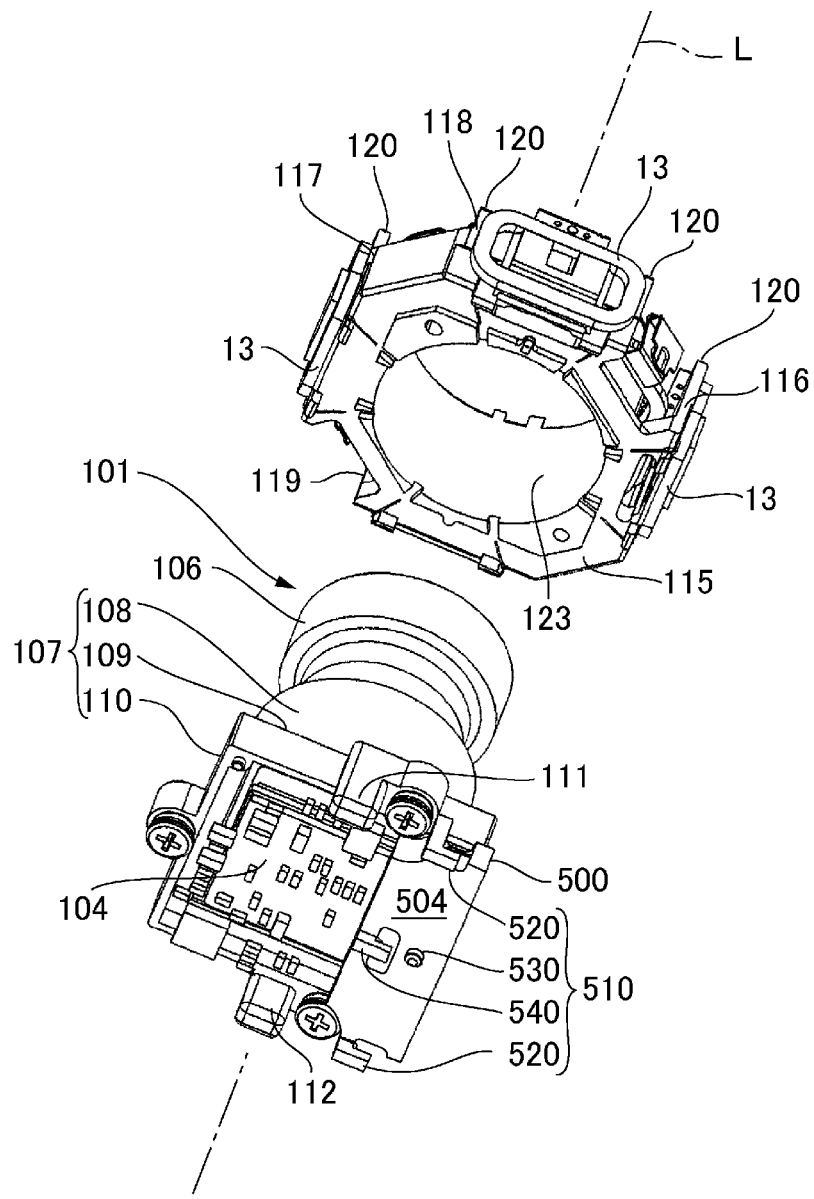
FIG. 9 is an exploded perspective view of the movable member, when seen from the counter-object side.

FIG. 8 is an exploded perspective view of the swing member 3, the swing supporting mechanism 4 and the plate spring 9, when seen from the +Z direction (i.e., the object side). FIG. 9 is an exploded perspective view of the swing member 3, the swing supporting mechanism 4 and the plate spring 9, when seen from the −Z direction (i.e., the counter-object side). As shown in FIG. 8 and FIG. 9, the swing member 3 is provided with: a camera module 101 (i.e., an optical module); and a camera module holder 102 configured to hold the camera module 101 from the outer circumferential side. As shown in FIG. 2, the camera module 101 includes: an optical element 2; and an imaging element 103 that is positioned on the optical axis of the optical element 2. The imaging element 103 is implemented on a substrate 104 on which a gyroscope, a signal processing circuit, etc., are mounted. To the substrate 104, the flexible printed circuit board 200 (see FIG. 1) is connected.

Furthermore, the camera module 101 includes: a mirror cylinder member 106 configured to hold the optical element 2; and a frame 107 configured to hold the mirror cylinder member 106 and the substrate 104. The frame 107 includes: a cylinder part 108 configured to hold, on the inner circumferential side, the end portion of the mirror cylinder member 106 with respect to the −Z direction; a rectangular plate part 109 extending toward the outer circumferential side from the end edge of the cylinder part 108 with respect to the −Z direction; and a square tube part 110 extending in the −Z direction from the outer circumferential edge of the plate part 109. As shown in FIG. 9, the substrate 104 is held on the inner circumferential side of the square tube part 110. Furthermore, the frame 107 is provided with first stopper projection parts 111 and 112, which protrude in the −Z direction, on the both sides with respect to the Y axis direction with the optical axis (i.e., the axis L), the imaging element 103 and the substrate 104 therebetween. The flexible printed circuit boards 200 and 300 (see FIG. 1) are drawn between the first stopper projection part 111 and the first stopper projection part 112. The first stopper projection parts 111 and 112 are opposed in the Z axis direction to the rectangular projection portions 82b provided on the opposing surface 82a of the holder bottom plate member 82, respectively, so as to configure a stopper mechanism 17 (see FIG. 2) that defines a swing range of the swing member 3.

As shown in FIG. 9, the camera module holder 102 is provided with: a bottom plate part 115 formed in a substantially octagonal shape, when seen in the Z axis direction; a pair of wall parts 116 and 117 rising in the +Z direction from both ends of the bottom plate part 115 with respect to the X axis direction and extending in the Y axis direction, respectively; and a pair of wall parts 118 and 119 rising in the +Z direction from both sides of the bottom plate part 115 with respect to the Y axis direction and extending in the X axis direction, respectively. To each of the wall parts 116, 117, 118 and 119, the swinging drive coil 13 is fixed.

On the end surfaces of the respective wall parts 116, 117, 118 and 119 with respect to the +Z direction, there are provided two second stopper projection part 120, which protrude in the +X direction. The two second stopper projection parts 120 protrude from both end portions of the respective wall parts 116, 117, 118 and 119 with respect to the circumferential direction. The second stopper projection parts 120 is opposed to the annular end surface 84a of the holder-side opposing part 8, which is provided in the −Z direction, so as to configure a stopper mechanism 18 (see FIG. 2) that defines the swing range of the swing member 3.

Furthermore, the camera module holder 102 is provided with a cylindrical holding part 123, which rises in the +Z direction from an edge of a circular through hole that is formed in the center of the bottom plate part 115. On an annular end surface 123a of the holding member 123 with respect to the +Z direction, plate-spring-fixation projection parts 124 for fixing the plate spring 9 are provided at four positions with equal angular intervals. The plate spring 9 is fixed to the annular end surface 123a via an adhesive agent layer. Therefore, when a movable-member-side connection part 141 is fixed to the annular end surface 123a, the plate spring 9 is floating from the annular end surface 123a with respect to the +Z direction.

(Plate Spring)

As shown in FIG. 6 and FIG. 7, the plate spring 9 is a rectangular-framed plate spring that is manufactured from a metal plate. The plate spring 9 is overhung between the annular end surface 123a (i.e., the end surface with respect to the +Z direction) of the holding part 123 provided on the camera module holder 102 and the annular end surface 84a, which is provided on the holder-side opposing part 84 of the holder main body member 81 and faces in the −Z direction. The plate spring 9 is provided with: the movable-member-side connection part 141, which is in an annular shape and is fixed to the annular end surface 123a; four holder-side connection parts 142, which are fixed to the annular end surface 84a; and winding parts 143, which are positioned between the movable-member-side connection part 141 and the respective holder-side connection parts 142 with respect to the radial direction. The movable-member-side connection part 141 includes four connection portions 141a, which are respectively fixed to the four plate-spring-fixation projection parts 124 provided on the annular end surface 123a from the outer circumferential side via an adhesive agent layer. The plate spring 9 defines the reference posture of the swing member 3. That is, posture of the swing member 3 (i.e., camera module 101) in a still state, or in a case where the magnetic driving mechanism for swing 11 is not driven, is determined by the plate spring 9.

(Swing Supporting Mechanism)

Figure 10:
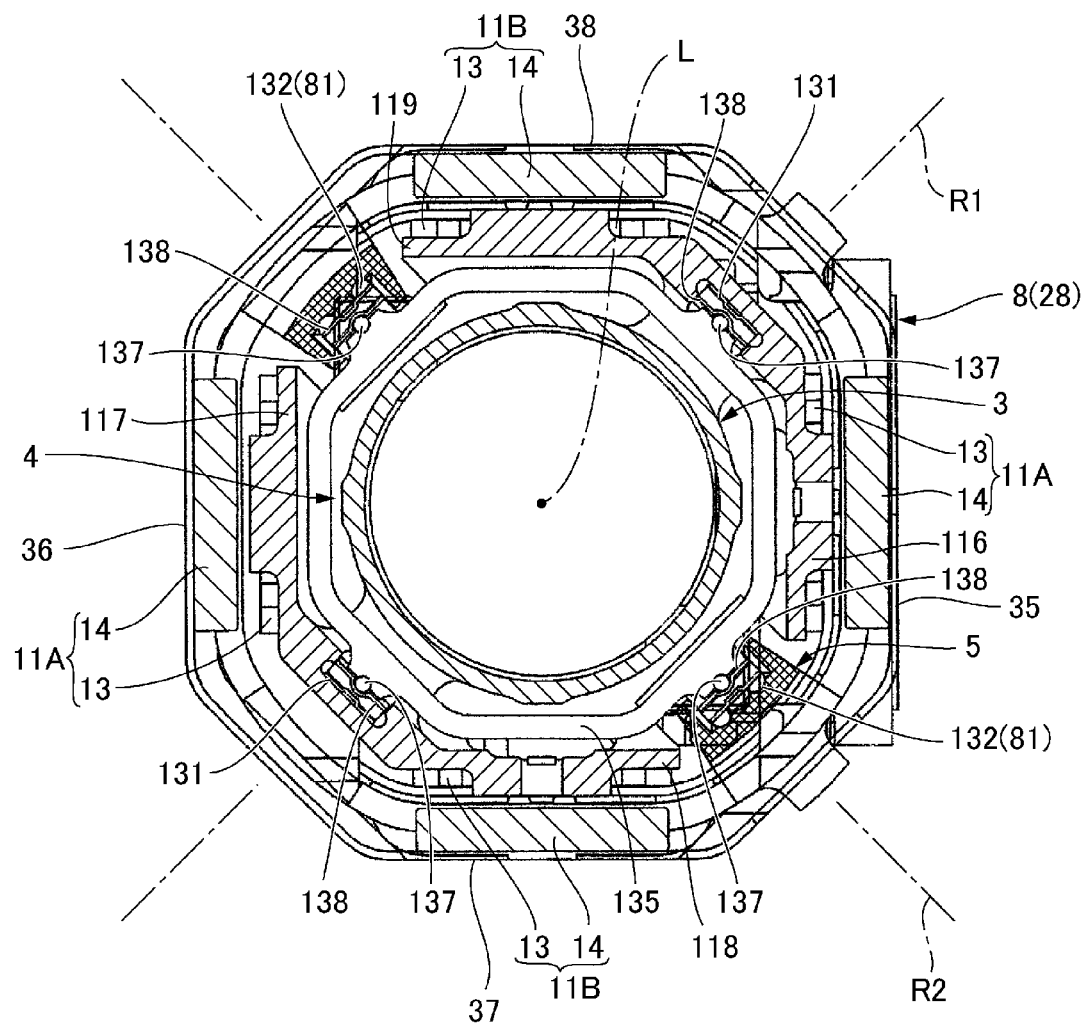
FIG. 10 is a sectional view of the optical unit, when being cut along a plane that is orthogonal to an axis.
Figure 10:
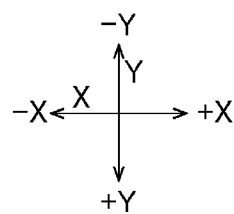

FIG. 10 is a sectional view of the optical unit 1, when being cut along a plane that is orthogonal to the axis L and passes through the swing supporting mechanism 4. The swing supporting mechanism 4 has a gimbal mechanism, which is configured between the camera module holder 102 and the holder main body member 81. As shown in FIG. 6 and FIG. 7, the swing supporting mechanism 4 is provided with: two first swing supporting parts 131 that are provided at diagonal positions of the camera module holder 102 with respect to a first axis R1; two second swing supporting parts 132 that are provided at diagonal positions of the holder main body member 81 with respect to a second axis R2; and a movable frame 135 that is supported by the first swing supporting parts 131 and the second swing supporting part 132. Here, the first axis R1 and the second axis R2 are in respective directions that are orthogonal to the Z axis direction and face diagonally at 45 degrees relative to the X axis direction and the Y axis direction. Therefore, the first swing supporting parts 131 and the second swing supporting parts 132 are disposed in respective angular positions that are between the X axis direction and the Y axis direction. As shown in FIG. 6 and FIG. 7, the second swing supporting parts 132 are depression parts that are formed on the inner surface of the holder main body member 81.

As shown in FIG. 10, the movable frame 135 is a plate-shaped spring formed in a substantially octagonal shape, when seen in planar view from the Z axis direction. On the outside surface of the movable frame 135, metallic balls 137 are fixed by way of welding, etc., at four positions around the axis L. The balls 137 respectively make point contact with contact springs 138, which are held by the first swing supporting parts 131 provided on the camera module holder 102 and the second swing supporting parts 132 provided on the holder main body part 81. The contact springs 138 are plate-shaped springs. Further, the contact springs 138 held by the first swing supporting parts 131 are elastically deformable in the direction of the first axis R1, and the contact springs 138 held by the second swing supporting parts 132 are elastically deformable in the direction of the second axis R2. Therefore, the movable frame 135 is supported such that the movable frame 135 can rotate on each of the two directions (i.e., the direction of the first axis R1 and the direction of the second axis R2) that are orthogonal to the Z axis direction.

(First Rotation Supporting Mechanism and Second Rotation Supporting Mechanism)

The following description explains the first rotation supporting mechanism 6 and the second rotation supporting mechanism 7 configured to support the holder 5 such that the holder 5 can rotate on the axis L. As shown in FIG. 2, FIG. 3 and FIG. 4, between the fixing-member-side opposing part 55 and the holder-side opposing part 84, the first rotation supporting mechanism 6 includes: multiple balls 151 (i.e., roll-moving members); and a retainer 152 configured to support the balls 151. As shown in FIG. 3 and FIG. 4, the retainer 152 includes multiple through holes 153, which are arranged in the circumferential direction at equal intervals. The multiple balls 151 are inserted between the fixing-member-side annular groove 56 and the holder-side annular groove 90 in a state of being arranged inside the multiple through holes 153, respectively. On the inner circumferential surfaces of the fixing-member-side annular groove 56 and the holder-side annular groove 90, lubricant oil is applied. In the present embodiment, the number of the balls 151 and the through holes 153 is 6. The balls 151 move in a rolling manner inside the fixing-member-side annular groove 56 and the holder-side annular groove 90 in a state of being positioned inside the respective through holes 153.

Furthermore, between two through holes 153 that are adjacent to each other in the circumferential direction, the retainer 152 includes: first projection parts 154 (see FIG. 3), which protrude toward the fixing-member-side opposing part 55; and second projection parts 155 (see FIG. 4), which protrude toward the holder-side opposing part 84. The middle portions of the respective first projection parts 154 can make contact in a sliding manner with the inner circumferential edge portion and the outer circumferential edge portion of the fixing-member-side annular groove 56 of the fixing-member-side opposing part 55. Furthermore, the middle portions of the respective second projection parts 155 can make contact in a sliding manner with the inner circumferential edge portion and the outer circumferential edge portion of the holder-side annular groove 90 of the holder-side opposing part 84.

As shown in FIG. 2, on the edge portion of the fixing-member-side opposing part 55 with respect to the inner circumferential side of the fixing-member-side annular groove 56, there is provided an annular projection part 157, which protrudes in the −Z direction. On the other hand, on the edge portion of the holder-side opposing part 84 with respect to the inner circumferential side of the holder-side annular groove 90, there is provided an annular stepped part 158, which is depressed in the −Z direction so as to accommodate the top end portion of the annular projection part 157. The space between the annular projection part 157 and the annular stepped part 158 configures a labyrinth seal. The labyrinth seal prevents or restrains dust from entering the space between the fixing-member-side opposing part 55 and the holder-side opposing part 84, where the balls 151 move in a rolling manner.

Next, as shown in FIG. 2, the ball bearing 68 of the second rotation supporting mechanism 7 is provided with: the inner ring 68b that is held on the outer circumferential side of the shaft part 96 of the holder 5 (i.e., the holder bottom plate member 82); the outer ring 68a, which is positioned on the outer circumferential side of the inner ring 68b; and multiple balls 68c that move in a rolling manner between the inner ring 68b and the outer ring 68a with respect to the radial direction. The outer ring 68a is held by the movable holder 26.

Here, the plate spring 25 imparts, to the ball bearing 68, given pressure (i.e., biasing force F) that is oriented in the +Z direction. That is to say, the plate spring 25 biases the movable holder 26 toward the holder-side opposing part 84, so as to bias the outer ring 68a, which is held by the holder 5, toward the holder-side opposing part 84. In the above way, positions of the inner ring 68b and the outer ring 68a relative to the holder-side opposing part 84 with respect to the Z axis direction are determined. Furthermore, the given pressure (i.e., the biasing force F of the plate spring 25) enables the outer ring 68a to maintain a state of abutting against the holder-side opposing part 84. Therefore, rotation of the holder 5, which is supported by the second rotation supporting mechanism 7, is stabilized.

Furthermore, the plate spring 25 biases the holder 5 toward the fixing-member-side opposing part 55 of the fixing member 8 (i.e., the object-side casing 29) via the movable holder 26 and the outer ring 68a. Therefore, the plate spring 25 imparts, to the first rotation supporting mechanism 6, given pressure (i.e., biasing force F of FIG. 2) that is oriented in the +Z direction. That is, the plate spring 25 biases the holder-side opposing part 84 toward the fixing-member-side opposing part 55 in the +Z direction. In the above way, the holder-side opposing part 84 and the fixing-member-side opposing part 55 do not become separated with respect to the Z axis direction. Therefore, the balls 151 that are held by the retainer 152 do not fall off the space between the holder-side annular groove 90 of the holder-side opposing part 84 and the fixing-member-side annular groove 56 of the fixing-member-side opposing part 55. Therefore, the holder 5 smoothly rotates relative to the fixing member 8.

Note that at least one of the first rotation supporting mechanism 6 and the second rotation supporting mechanism 7 may be a plain bearing, instead of a ball bearing.

(Magnetic Driving Mechanism for Swing)

The magnetic driving mechanism for swing 11 includes a first magnetic driving mechanism for swing 11A and a second magnetic driving mechanism for swing 11B, which are provided between the swing member 3 and the fixing member 8. The first magnetic driving mechanism for swing 11A includes two pairs of a swinging drive magnet 14 and a swinging drive coil 13, which are opposed to each other in the X axis direction. The second magnetic driving mechanism for swing 11B includes two pairs of a swinging drive magnet 14 and a swinging drive coil 13, which are opposed to each other in the Y axis direction. The swinging drive coils 13 are held on the outside surfaces of the wall parts 116 and 117, which are on both sides of the camera module holder 102 with respect to the X axis direction, and the outside surfaces of the wall parts 118 and 119, which are on both sides of the camera module holder 102 with respect to the Y axis direction. The swinging drive magnets 14 are held on the inside surfaces of the side plates 35, 36, 37 and 38, which are provided on the cylindrical casing 28 of the fixing member 8. As shown in FIG. 3 and FIG. 4, each of the swinging drive magnets 14 is separated in the Z axis direction, and are magnetized such that the magnetic poles on the inside surfaces are different with reference to a divisional position (i.e., a magnetized polarized line). The swinging drive coils 13 are coreless coils, and the long edge portions on the +Z direction side and on the −Z direction side are utilized as effective edges. Here, the cylindrical casing 28 is made of magnetic material, and therefore functions as a yoke relative to the swinging drive magnets 14.

The two pairs of the second magnetic driving mechanisms for swing 11, which are positioned on the +Y direction side and on the −Y direction side of the swing member 3, are connected by wiring such that magnetic driving force is generated in the same direction at the periphery of the X axis when power is supplied to the swinging drive coils 13. Furthermore, the two pairs of the first magnetic driving mechanisms for swing 11A, which are positioned on the +X direction side and on the −X direction side of the swing member 3, are connected by wiring such that magnetic driving force is generated in the same direction at the periphery of the Y axis when power is supplied to the swinging drive coils 13. The magnetic driving mechanism for swing 11 causes the swing member 3 to rotate on the first axis R1 and on the second axis R2, by way of synthesizing rotation of the second magnetic driving mechanism for swing 11B on the X axis and rotation of the first magnetic driving mechanism for swing 11A on the Y axis. In a case of performing image stabilization on the X axis and image stabilization on the Y axis, one rotation on the first axis R1 and two rotations of the second axis R2 are synthesized.

(Magnetic Drive Mechanism for Rolling)

As shown in FIG. 2, the magnetic drive mechanism for rolling 12 includes: two rolling drive coils 15, which are held by the rolling drive coil holding parts 97 that are provided on both sides of the holder bottom plate member 82 with respect to the Y axis direction with the shaft part 96 therebetween; and the rolling drive magnets 16, which are held by the movable holder 26 of the fixing member 8 and are respectively opposed to the rolling drive coils 15 in the Z axis direction. As shown in FIG. 3 and FIG. 5, each of the rolling drive magnets 16 is separated in the circumferential direction, and are magnetized such that the magnetic poles on the surfaces that are respectively opposed to the rolling drive coils 15 are different with reference to a divisional position (i.e., a magnetized polarized line). The rolling drive coils 15 are coreless coils, and the long edge portions extending in the radial direction are utilized as effective edges.

(Image Stabilization of the Optical Unit)

As described above, the optical unit 1 includes the magnetic driving mechanism for swing 11 that is configured to performing swing correction on the X axis and swing correction on the Y axis direction. Therefore, swing correction in the pitching (i.e., vertical swing) direction and the yawing (i.e., transverse swing) direction is possible. Furthermore, as the optical unit 1 includes the magnetic drive mechanism for rolling 12, it is possible to perform swing correction in the rolling direction. Here, in the optical unit 1 includes a gyroscope on the swing member 3, and therefore the optical unit 1 detects swing on three axes, which are orthogonal to each other, by use of the gyroscope, so as to drive the magnetic driving mechanism for swing 11 and the magnetic drive mechanism for rolling 12 such that the detected swing is offset.

(Fixing Structure of the Flexible Printed Circuit Boards)

Figure 11:
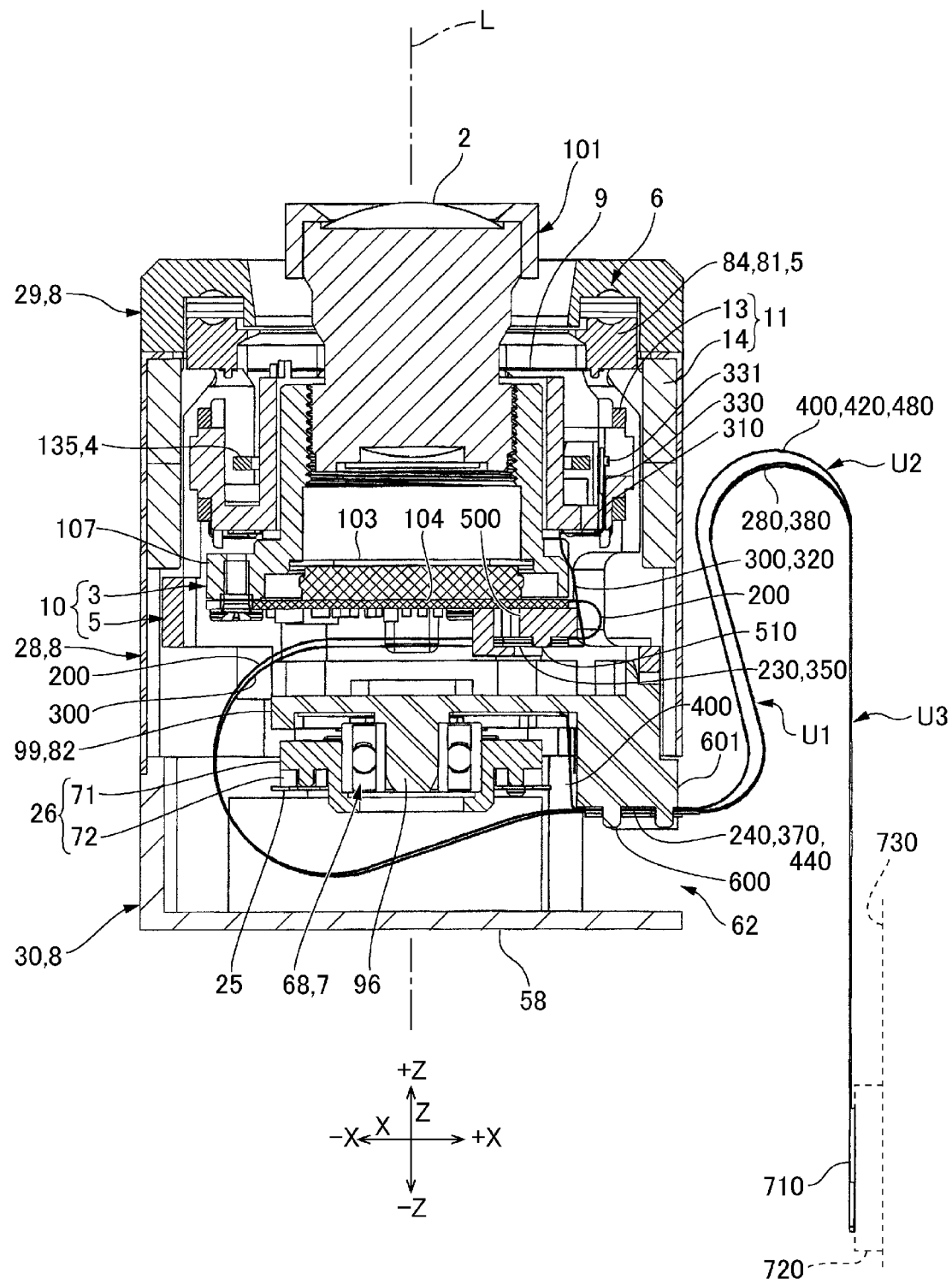
FIG. 11 is a sectional view of the optical unit taken along a line B-B of FIG. 1.

FIG. 11 is a sectional view of the optical unit 1 taken along the line B-B of FIG. 1. As shown in FIG. 11, a flexible printed circuit board 200 (i.e., a flexible printed circuit board for optical module), which is connected to the camera module 101, is drawn out from one end (i.e., an edge part with respect to the +X direction) of the substrate 104 and is folded into a U-shape, such that the flexible printed circuit board 200 is drawn in parallel to the substrate 104 on the −Z direction side of the substrate 104. Furthermore, a flexible printed circuit board 300 (i.e., a flexible printed circuit board for swing), which is connected to the swinging drive coil 13, is drawn from one end (i.e., an edge part with respect to the +X direction) of the bottom plate part 115 of the camera module holder 102 toward the end part of the substrate 104 with respect to the +X direction and is bent toward the −X direction, so as to be joined together with the flexible printed circuit board 200 and drawn between the substrate 104 and the holder bottom plate member 82 in parallel to the substrate 104.

The substrate 104 is mounted with an imaging element 103 on the surface (i.e., the surface facing in the +Z direction) facing the optical element 2 and is mounted with electronic parts on the surface (i.e., the surface facing in the −Z direction) facing the opposite side of the optical element 2. The substrate 104 is provided with a flat part, on which no electronic parts are provided, at the end part with respect to the +X direction on the surface facing in the −Z direction. Further, a spacer 500 is fixed to the flat part. On the spacer 500, there is formed a first movable-member-side fixing part 510 (i.e., a fixing part), to which the flexible printed circuit boards 200 and 300 are fixed. The flexible printed circuit board 200 is folded into a U-shape upon being drawn out from the substrate 104 and is drawn to a position that is along the first movable-member-side fixing part 510, so as to be fixed to the first movable-member-side fixing part 510. Furthermore, the flexible printed circuit board 300 is fixed to the first movable-member-side fixing part 510 in a state of being overlapped with the flexible printed circuit board 200. That is, the flexible printed circuit boards 200 and 300 are fixed together to the first movable-member-side fixing part 510.

The flexible printed circuit boards 200 and 300, which are drawn from the first movable-member-side fixing part 510 toward the −X direction, are folded into U-shapes again at a position that is beyond the end edge of the holder bottom plate member 82 with respect to the −X direction, such that the flexible printed circuit boards 200 and 300 pass through the space between the movable holder 26/plate spring 25 and the counter-object-side casing 30, which are arranged on the −Z direction side of the holder bottom plate member 82, and are drawn toward the +X direction. Further, the flexible printed circuit boards 200 and 300 are fixed to a second movable-member-side fixing part 600, which is formed at the end part of the holder bottom plate member 82 with respect to the +X direction. To the second movable-member-side fixing part 600, a flexible printed circuit board 400 (i.e., a flexible printed circuit board for rolling), which is connected to the rolling drive coils 15, is fixed, in addition to the flexible printed circuit boards 200 and 300. That is, the flexible printed circuit boards 200, 300 and 400 are fixed together to the second movable-member-side fixing part 600. The second movable-member-side fixing part 600 is provided nearby the aperture part 62 of the counter-object-side casing 30. Therefore, the flexible printed circuit boards 200, 300 and 400 are drawn out from the aperture part 62 to the outside of the fixing member 8 upon being fixed to the second movable-member-side fixing part 600.

(Structure of Flexible Printed Circuit Boards)

Figure 12:
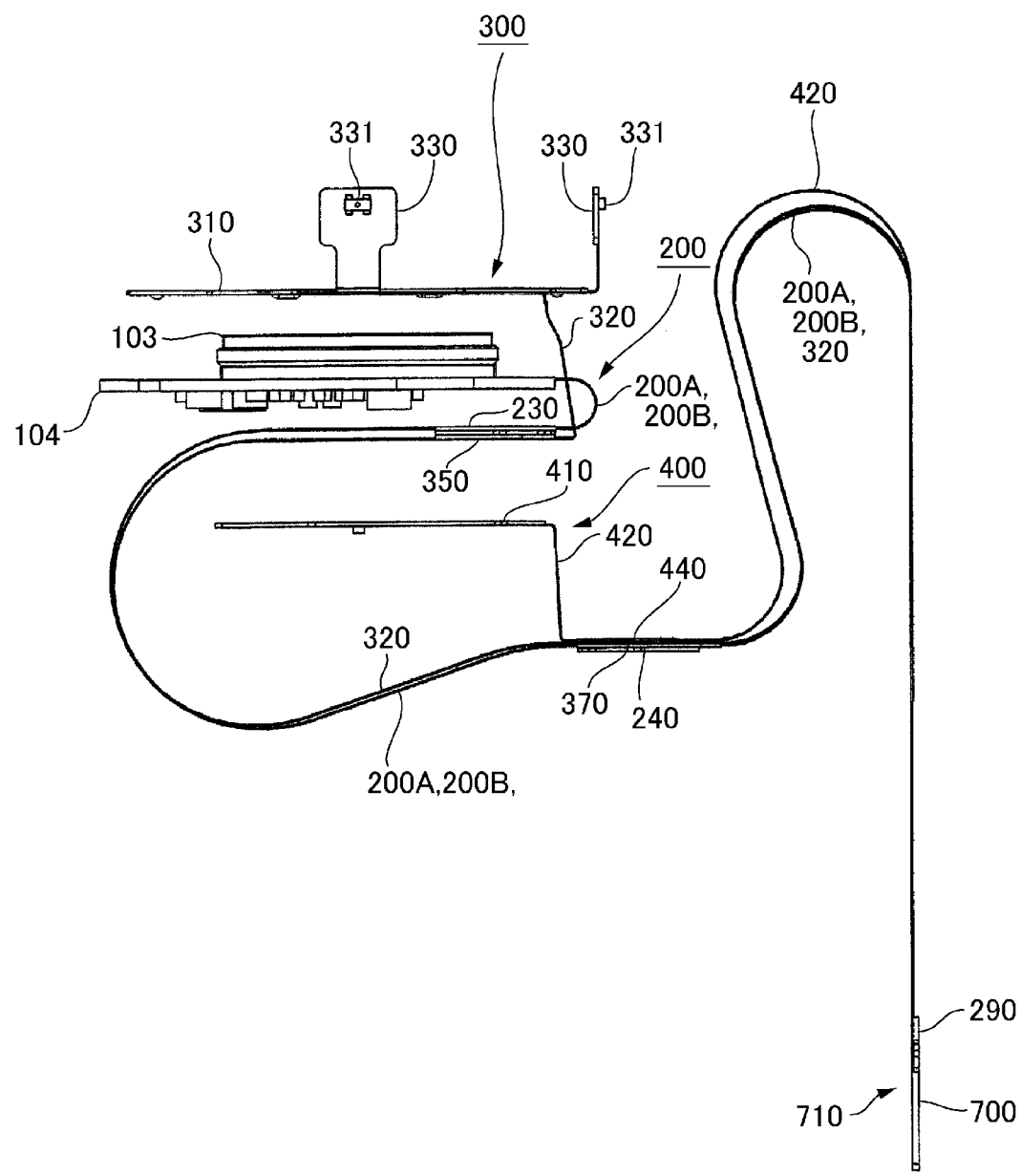
FIG. 12 is a side view of flexible printed circuit boards.
Figure 13:
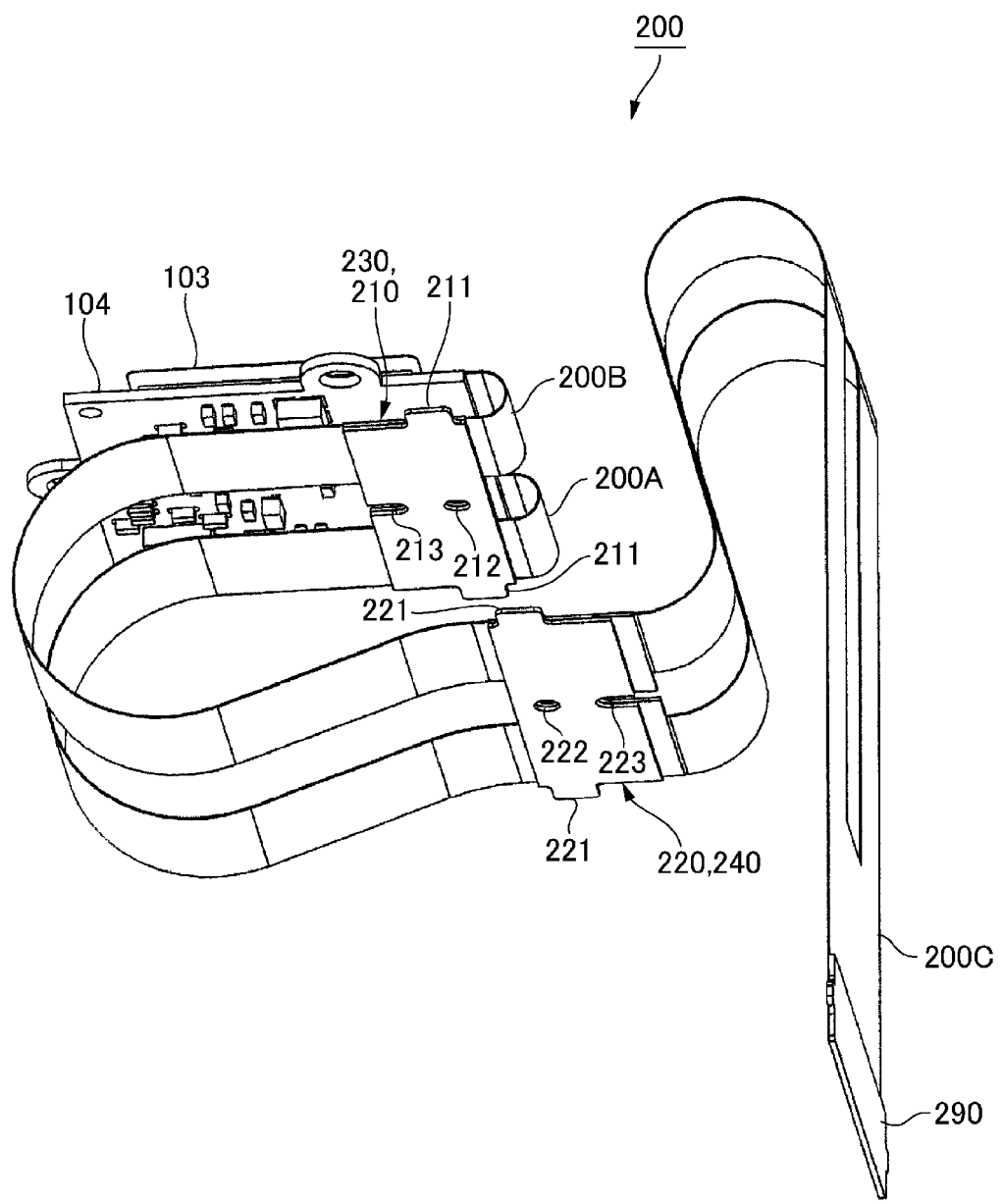
FIG. 13 is a perspective view of a flexible printed circuit board, which is connected to a camera module.
Figure 14:
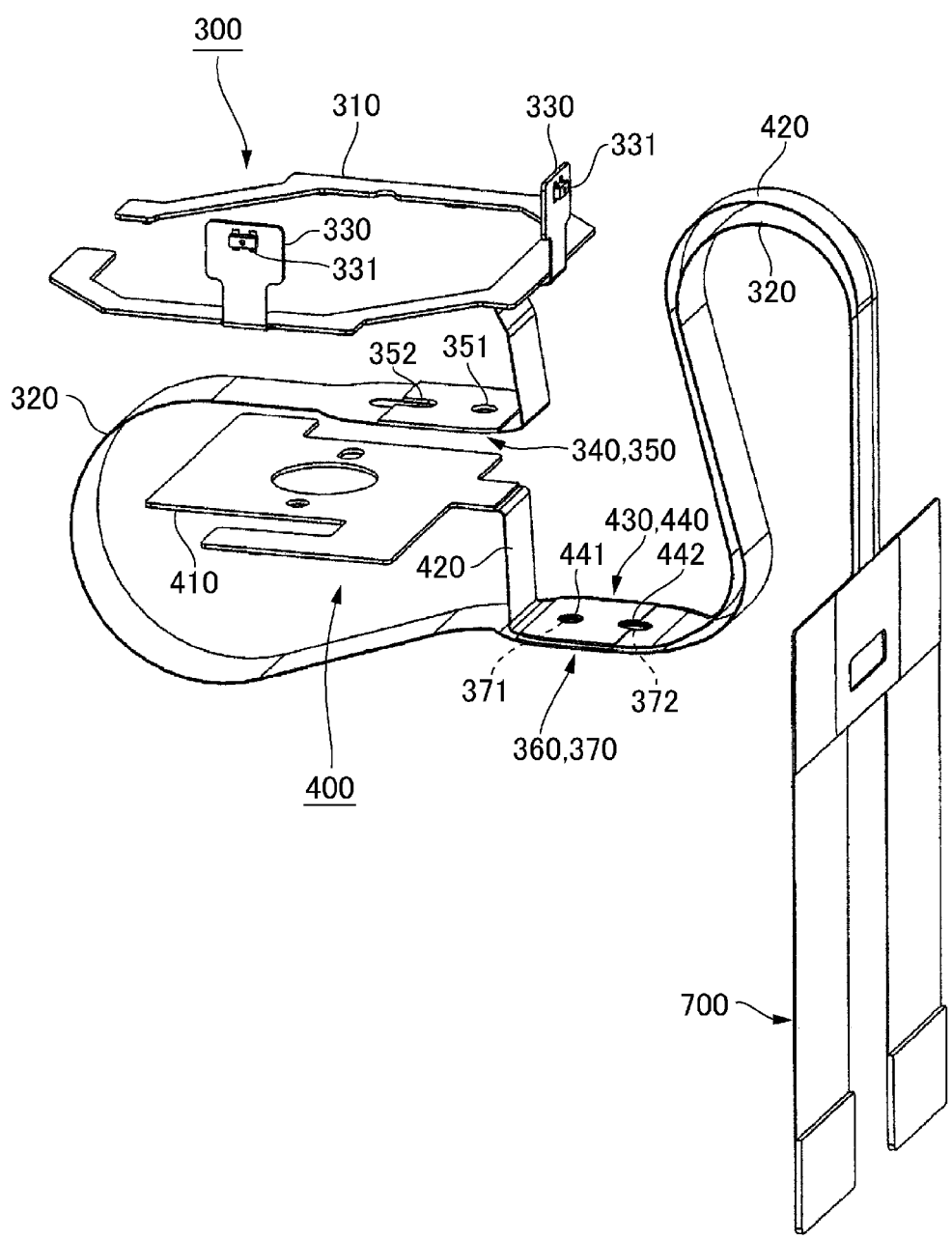
FIG. 14 is a perspective view of flexible printed circuit boards, which are connected to a magnetic driving mechanism for swing and a magnetic drive mechanism for rolling, respectively.

FIG. 12 is a side view of the flexible printed circuit boards 200, 300 and 400. Furthermore, FIG. 13 is a perspective view of the flexible printed circuit board 200, which is connected to the camera module 101. Further, FIG. 14 is a perspective view of the flexible printed circuit boards 300 and 400, which are connected to the magnetic driving mechanism for swing 11 and the magnetic drive mechanism for rolling 12, respectively. As shown in FIG. 12 and FIG. 13, one end of the flexible printed circuit board 200 is connected to the substrate 104, and a connector inserting part 290 is formed on the other end. The flexible printed circuit board 200 is provided with two flexible substrate portions 200A and 200B, which are connected to the substrate 104. Further, the two flexible substrate portions 200A and 200B are connected to a wide flexible substrate portion 200C, which is connected to the connector inserting part 290. As for the flexible substrate portions 200A and 200B, a first stiffener plate 210 is fixed to a fixation position to which the flexible substrate portions 200A and 200B are fixed to the first movable-member-side fixing part 510, and a second stiffener plate 220 is fixed to a fixation position to which the flexible substrate portions 200A and 200B are fixed to the second movable-member-side fixing part 600.

The two flexible substrate portions 200A and 200B are arranged in parallel to each other with a predetermined distance. Each of the first stiffener plate 210 and the second stiffener plate 220 is in a substantially rectangular board-form, with the longitudinal direction corresponding to the width direction of the flexible printed circuit board 200. As for each of the first stiffener plate 210 and the second stiffener plate 220, the flexible substrate portion 200A is fixed to one end of the longitudinal direction and the flexible substrate portion 200B is fixed to the other end of the longitudinal direction. That is, the flexible substrate portions 200A and 200B are held by the first stiffener plate 210 and the second stiffener plate 220, such that the flexible substrate portions 200A and 200B have a predetermined distance from each other.

The flexible printed circuit board 200 is provided with a first fixation member 230, which is fixed to the first movable-member-side fixing part 510, and a second fixation member 240, which is fixed to the second movable-member-side fixing part 600. The first fixation member 230 is configured by fixing the first stiffener plate 210 to the flexible substrate portions 200A and 200B. Furthermore, the second fixation member 240 is configured by fixing the second stiffener plate 220 to the flexible substrate portions 200A and 200B. The first fixation member 230 is provided with: hooked parts 211 that are formed on both edges of the first stiffener plate 210 with respect to the longitudinal direction (i.e., the width direction of the flexible printed circuit board 200); and engagement holes 212 and 213 (i.e., engagement parts) that are formed in the middle of the first stiffener plate 210 with respect to the longitudinal direction. Furthermore, the second fixation member 240 is provided with: hooked parts 221 that are formed on both edges of the second stiffener plate 220 with respect to the longitudinal direction (i.e., the width direction of the flexible printed circuit board 200); and engagement holes 222 and 223 (i.e., engagement parts) that are formed in the middle of the second stiffener plate 220 with respect to the longitudinal direction. The hooked parts 211 and 221 protrude outward in the width direction of the flexible substrate portions 200A and 200B.

The engagement holes 212 and 213, which are formed in the first stiffener plate 210, differ in positions with respect to the direction orthogonal to the width direction of the flexible printed circuit board 200. More specifically, the engagement hole 212 is formed on the first stiffener plate 210 nearby the edge on the substrate 104 side, and the engagement hole 213 is formed at the edge on the connector inserting part 290 side. In the present embodiment, the engagement hole 213 has a cutout-shape, which is formed by cutting out the edge of the first stiffener plate 210 on the connector inserting part 290 side, and therefore is connected to the space between the flexible substrate portions 200A and 200B.

Similarly, the engagement holes 222 and 223, which are formed on the second stiffener plate 220, differ in positions with respect to the direction orthogonal to the width direction of the flexible printed circuit board 200. More specifically, the engagement hole 222 is formed on the second stiffener plate 220 nearby the edge on the substrate 104 side, and the engagement hole 223 is formed at the edge on the connector inserting part 290 side. In the present embodiment, the engagement hole 223 has a cutout-shape, which is formed by cutting out the edge of the second stiffener plate 220 on the connector inserting part 290 side. Note that it is possible that the engagement holes 213 and 223 have shapes of elongate holes, not cutout-shapes as described in the present embodiment.

As shown in FIG. 12 and FIG. 14, on one end of the flexible printed circuit board 300, which is configured to be connected to the magnetic driving mechanism for swing 11, there is formed a frame portion 310, which is configured to be connected to the swinging drive coils 13. Further, the other end is connected to a connector inserting part 700, which is in common with the flexible printed circuit board 400. The flexible printed circuit board 300 is provided with: a flexible substrate portion 320, which is connected to the inner circumferential edge of the frame portion 310; and sensor supporting units 330, which respectively rise from two positions on the outer circumferential edge of the frame portion 310. The frame portion 310 is configured to be fixed to the bottom plate part 115 of the camera module holder 102. The coil wires of the swinging drive coils 13 are connected to a land (illustration omitted in drawings), which is formed on the frame portion 310. To the sensor supporting units 330, magnetic sensors 331 are fixed, respectively. The magnetic sensors 331 detect magnetic fields created by the swinging drive magnets 14, which are opposed to the swinging drive coils 13, respectively. Note that each sensor supporting unit 330 may be provided with a thermistor.

The flexible printed circuit board 300 is provided with: a third fixation member 350, which is formed by fixing a third stiffener plate 340 to the flexible substrate portion 320; and a fourth fixation member 370, which is formed by fixing a fourth stiffener plate 360 to the flexible substrate portion 320. The third fixation member 350 is a portion that is overlapped with the first fixation member 230 of the flexible printed circuit board 200 and is fixed to the first movable-member-side fixing part 510. Further, the third fixation member 350 is provided with engagement holes 351 and 352, which are respectively overlapped with the engagement holes 212 and the 213 formed on the first stiffener plate 210. Furthermore, the fourth fixation member 370 is a portion that is overlapped with the second fixation member 240 of the flexible printed circuit board 200 and is fixed to the second movable-member-side fixing part 600. Further, the fourth fixation member 370 is provided with engagement holes 371 and 372, which are respectively overlapped with the engagement holes 222 and the 223 formed on the second stiffener plate 220.

As shown in FIG. 12 and FIG. 14, on one end of the flexible printed circuit board 400, which is configured to be connected to the magnetic drive mechanism for rolling 12, there is formed a plate-shape part 410, which is configured to be connected to the rolling drive coils 15. Further, the other end is connected to the connector inserting part 700. Further, the flexible printed circuit board 400 is provided with a flexible substrate portion 420, which extends between the plate-shape part 410 and the connector inserting part 700. The flexible printed circuit board 400 is provided with a fifth fixation member 440, which is formed by fixing a fifth stiffener plate 430 to the flexible substrate portion 420. The fifth fixation member 440 is a portion that is overlapped with the second fixation member 240 of the flexible printed circuit board 200 and the fourth fixation member 370 of the flexible printed circuit board 300 and is fixed to the second movable-member-side fixing part 600. Further, the fifth fixation member 440 is provided with engagement holes 441 and 442, which are respectively overlapped with the engagement holes 222 and the 223 and the engagement holes 371 and 372.

As shown in FIG. 1, the flexible substrate portion 320 of the flexible printed circuit board 300 and the flexible substrate portion 420 of the flexible printed circuit board 400 are arranged and drawn in the space between the flexible substrate portions 200A and 200B. Furthermore, a common connector inserting part 710 is configured by fixing the connector inserting part 290 of the flexible printed circuit board 200 to the connector inserting part 700 of the flexible printed circuit boards 300 and 400. As shown in FIG. 11, the main body of an optical apparatus, on which the optical unit 1 is mounted, is provided with a connector part 720 to which the common connector inserting part 710 is connected. That is, the flexible printed circuit boards 200, 300 and 400 are drawn between the movable member 10 and a supporting member 730 provided with the connector part 720. Here, the supporting member 730 may be, for example, a portion such as a frame or a main substrate provided on the main body of an optical apparatus.

(Fixing Structure to the First Movable-Member-Side Fixing Part)

Figure 15:
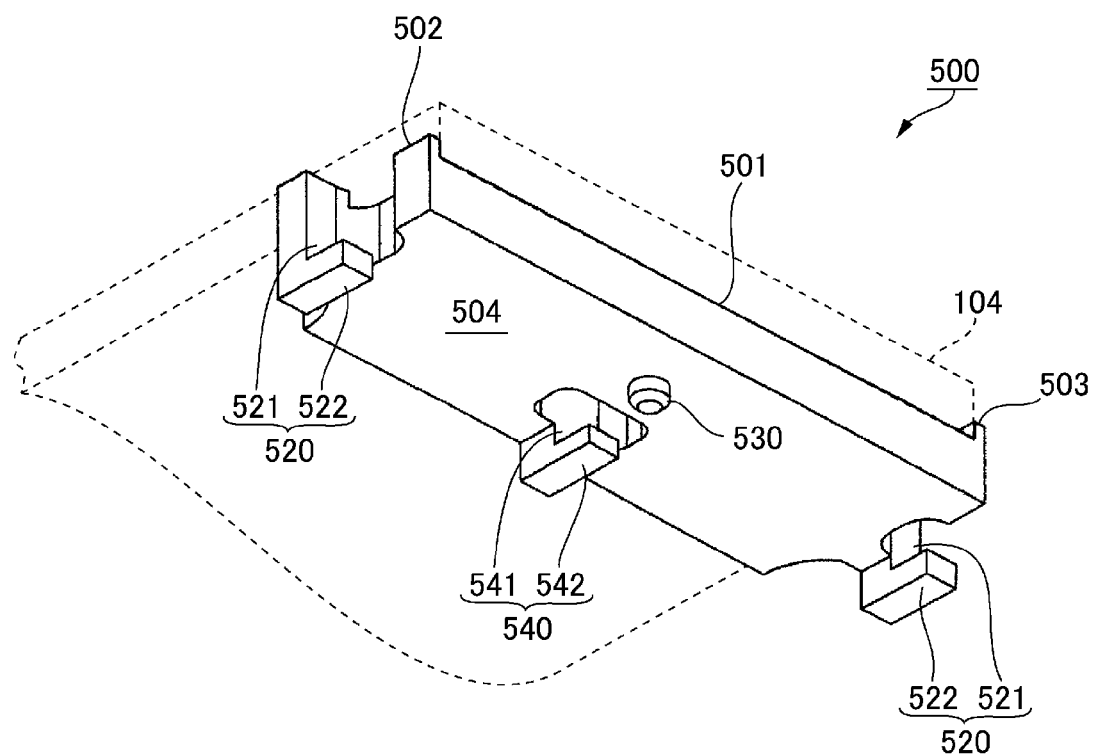
FIG. 15 is a perspective view of a spacer, when seen from a first movable-member-side fixing part.
Figure 16:
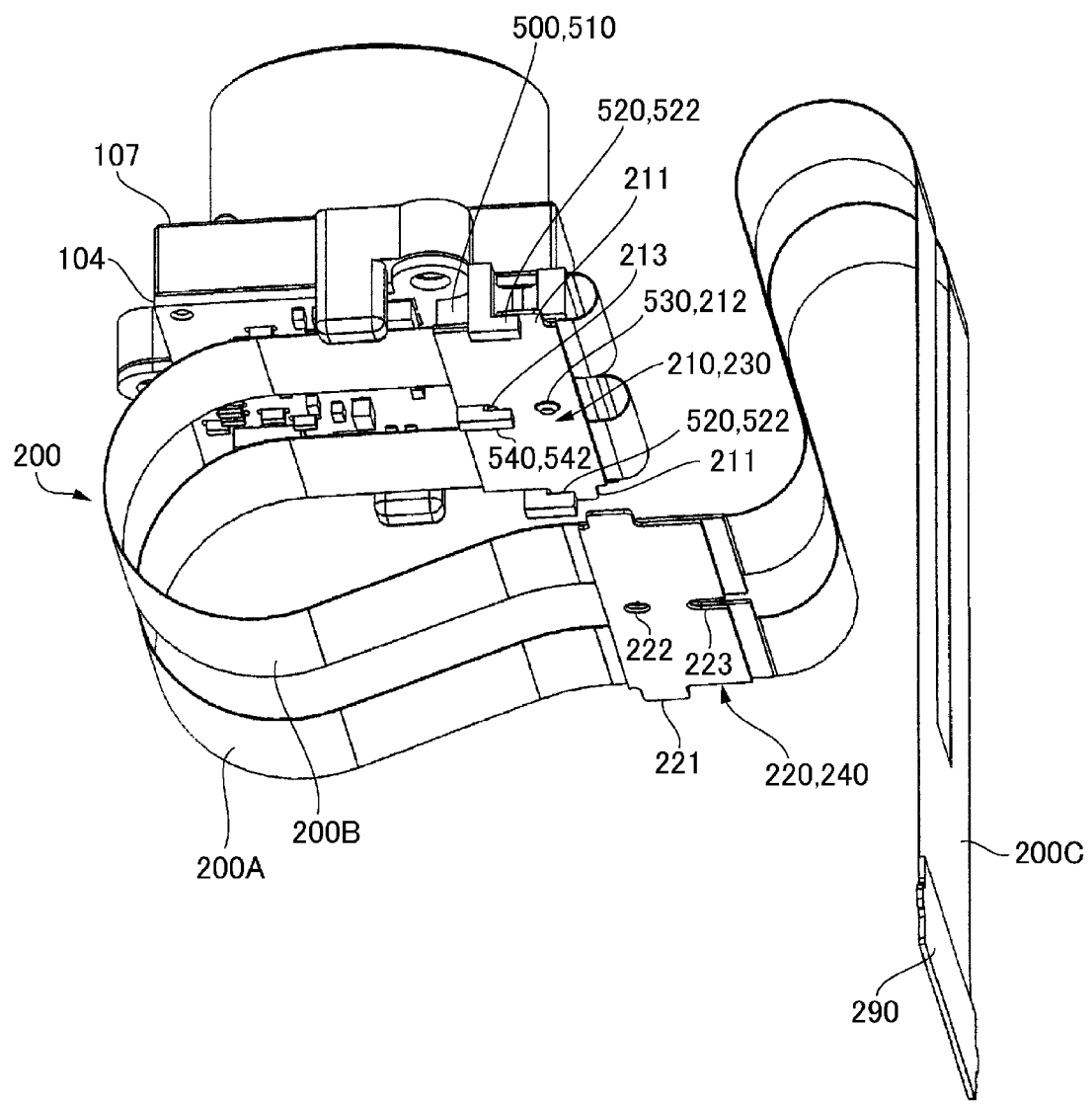
FIG. 16 is a perspective view of the first movable-member-side fixing part to which the flexible printed circuit board is fixed.
Figure 17:
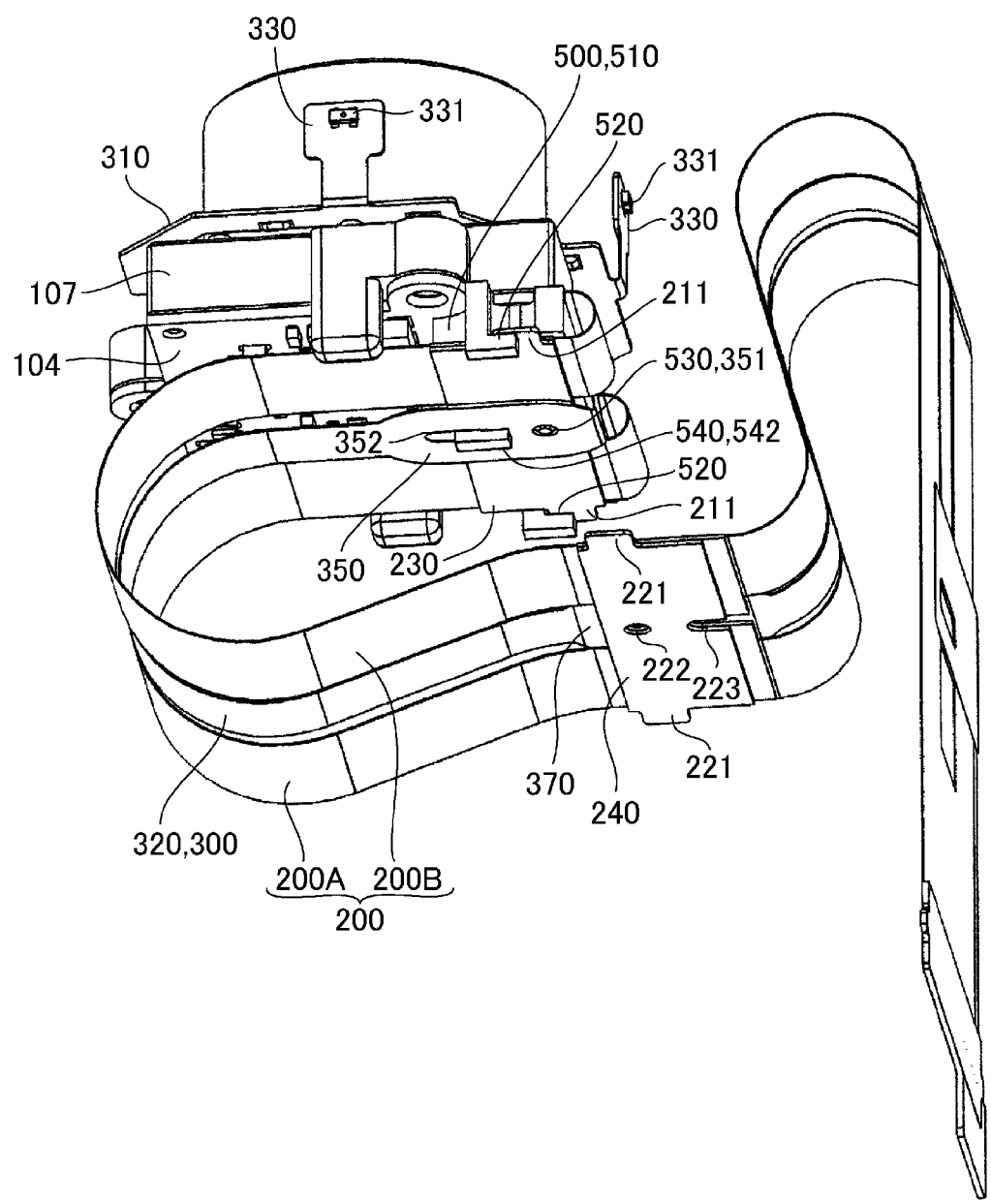
FIG. 17 is a perspective view of the first movable-member-side fixing part to which the flexible printed circuit boards are fixed.

FIG. 15 is a perspective view of the spacer 500, when seen from the first movable-member-side fixing part 510. Furthermore, FIG. 16 is a perspective view of the first movable-member-side fixing part 510 to which the flexible printed circuit board 200 is fixed. Further, FIG. 17 is a perspective view of the first movable-member-side fixing part 510 to which the flexible printed circuit boards 200 and 300 are fixed. The overall shape of the spacer 500 is substantially rectangular, and the spacer 500 is fixed to the edge part of the substrate 104 with respect to the +X direction with the longitudinal direction of the spacer 500 being in the Y axis direction. The spacer 500 is provided with a mounting surface 501 that faces in the +Z direction. Further, on the mounting surface 501, there are formed guide parts 502 and 503, which respectively conform to the outlines of edges of the substrate 104 with respect to the +Y direction and the −Y direction. The guide parts 502 and 503 are projection parts formed along the edges of the mounting surface 501 with respect to the +Y direction and the −Y direction, respectively. The substrate 104 is engaged with a concave portion in a groove-shape, which is formed by the guide parts 502 and 503 and the mounting surface 501, such that the substrate 104 abuts against the mounting surface 501.

The first movable-member-side fixing part 510 is formed on a bottom end surface 504, which is the surface opposite to the mounting surface 501 of the spacer 500. The first movable-member-side fixing part 510 is provided with: two first hook parts 520, which are respectively formed on both ends of the spacer 500 with respect to the Y axis direction; a cylindrical projection part 530, which protrudes from the substantially center of the spacer 500 with respect to the Y axis direction; and a second hook part 540, which is positioned in the −X direction relative to the projection part 530. In other words, the first movable-member-side fixing part 510 is provided with two projection parts (i.e., the projection part 530 and the second hook part 540), which are apart from each other in the X axis direction.

Each of the first hook parts 520 is in a bent-shape, which is provided with: a butting part 521, which is in a shape of a square pole protruding in the −Z direction relative to the bottom end surface 504 of the spacer 500; and a holding part 522, which protrudes in the +X direction as a bent from the tip of the butting part 521. Between the holding part 522 of each first hook part 520 and the bottom end surface 504 of the spacer 500, there is formed a space into which a hooked part 211 formed on the first stiffener plate 210 for the flexible printed circuit board 200 can be inserted. Furthermore, the second hook part 540 is in the substantially same shape as the first hook parts 520, i.e., a bent-shape, which is provided with a butting part 541 and a holding part 542.

When the first fixation member 230 of the flexible printed circuit board 200 is fixed to the first movable-member-side fixing part 510, the first stiffener plate 210 is inclined such that the edge of the first stiffener plate 210 with respect to the +X direction is kept away from the bottom end surface 504, and then the edge of the first stiffener plate 210 with respect to the −X direction is slid along the bottom end surface 504 toward the −X direction. In this way, the hooked parts 211 of the first stiffener plate 210 are inserted between the first hook parts 520 and the bottom end surface 504 of the spacer 500, and the hooked parts 211 are held by the holding parts 522, respectively. Furthermore, the butting part 541 of the second hook part 540 is inserted into the engagement hole 213 provided at the edge of the first stiffener plate 210 with respect to the −X direction, so that the central part of the first stiffener plate 210 with respect to the width direction (i.e., the Y axis direction) is held by the holding part 542.

The first hook parts 520 and the second hook part 540 differ in positions with respect to the direction orthogonal to the width direction (i.e., the Y axis direction) of the flexible substrate portions 200A and 200B, such that the second hook part 540 is arranged in the −X direction relative to the first hook parts 520. In other words, the first hook parts 520 and the second hook part 540 differ in positions with respect to the inserting direction (i.e., the X axis direction) for inserting the first stiffener plate 210.

When the first stiffener plate 210 is abutted against by the butting parts 521 of the first hook parts 520 and the butting part 541 of the second hook part 540 in order to insert the first stiffener plate 210 into the first hook parts 520 and the second hook part 540, position of the first stiffener plate 210 is determined such that the projection part 530, which protrudes from the bottom end surface 504 of the spacer 500, and another engagement hole 212 are overlapped. Then, the projection part 530 is engaged with the engagement hole 212 such that the first fixation member 230 abuts against the bottom end surface 504. In this way, as shown in FIG. 16, the first fixation member 230 of the flexible printed circuit board 200 is fixed to the first movable-member-side fixing part 510.

Next, as shown in FIG. 17, the third fixation member 350 of the flexible printed circuit board 300 is overlapped with the middle part of the first fixation member 230 with respect to the width direction, so as to be fixed to the projection part 530 and the second hook part 540 of the first movable-member-side fixing part 510. The engagement holes 351 and 352 on the third fixation member 350 are formed on positions which correspond to the projection part 530 and the second hook part 540, respectively. The engagement hole 352, which is positioned on the −X direction side, is in a shape of an elongate hole into which the second hook part 540 can be inserted. When the second hook part 540 is inserted into the engagement hole 352 and the third fixation member 350 is slid toward the −X direction, the third stiffener plate 340 is held by the holding part 542 of the second hook part 540. Here, when the butting part 541 of the second hook part 540 abuts against the edge of the engagement hole 352 with respect to the +X direction, which is in a shape of an elongate hole, position of the first stiffener plate 210 is determined such that the projection part 530 and another engagement hole 351 are overlapped. In the above state, when the tip of the projection part 530 is engaged with the engagement hole 351, which is in a round shape, the third fixation member 350 of the flexible printed circuit board 300 is fixed to the first movable-member-side fixing part 510.

As for the first fixation member 230 of the flexible printed circuit board 200 and the third fixation member 350 of the flexible printed circuit board 300, the pair of the engagement holes 212 and 213 and the pair of the engagement holes 351 and 352, which are respectively engaged with the projection part 530 and the second hook part 540 of the first movable-member-side fixing part 510 are reference holes for engaging the engagement holes 212 and 351, which are positioned on the +X direction side, with the cylindrical projection part 530.

(Fixing Structure to the Second Movable-Member-Side Fixing Part)

Figure 18:
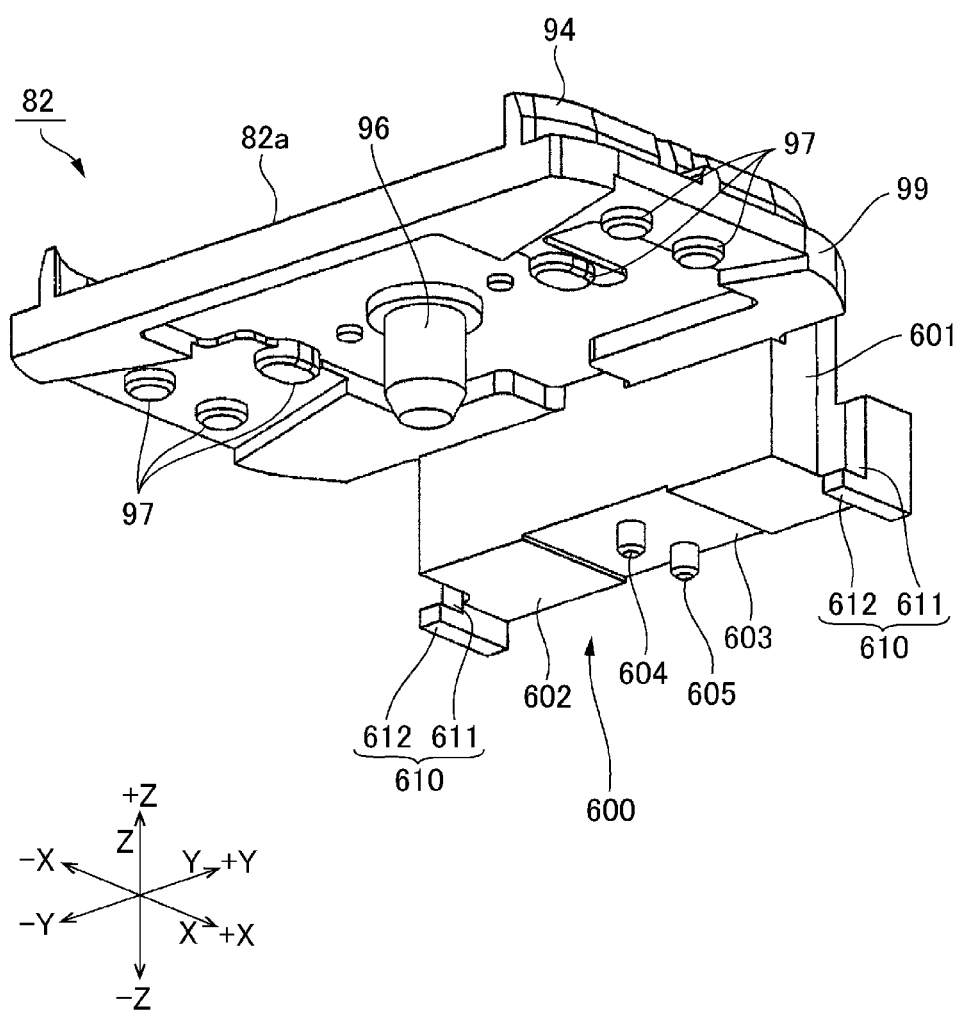
FIG. 18 is a perspective view of a holder bottom plate member, when seen from a second movable-member-side fixing part side.
Figure 19:
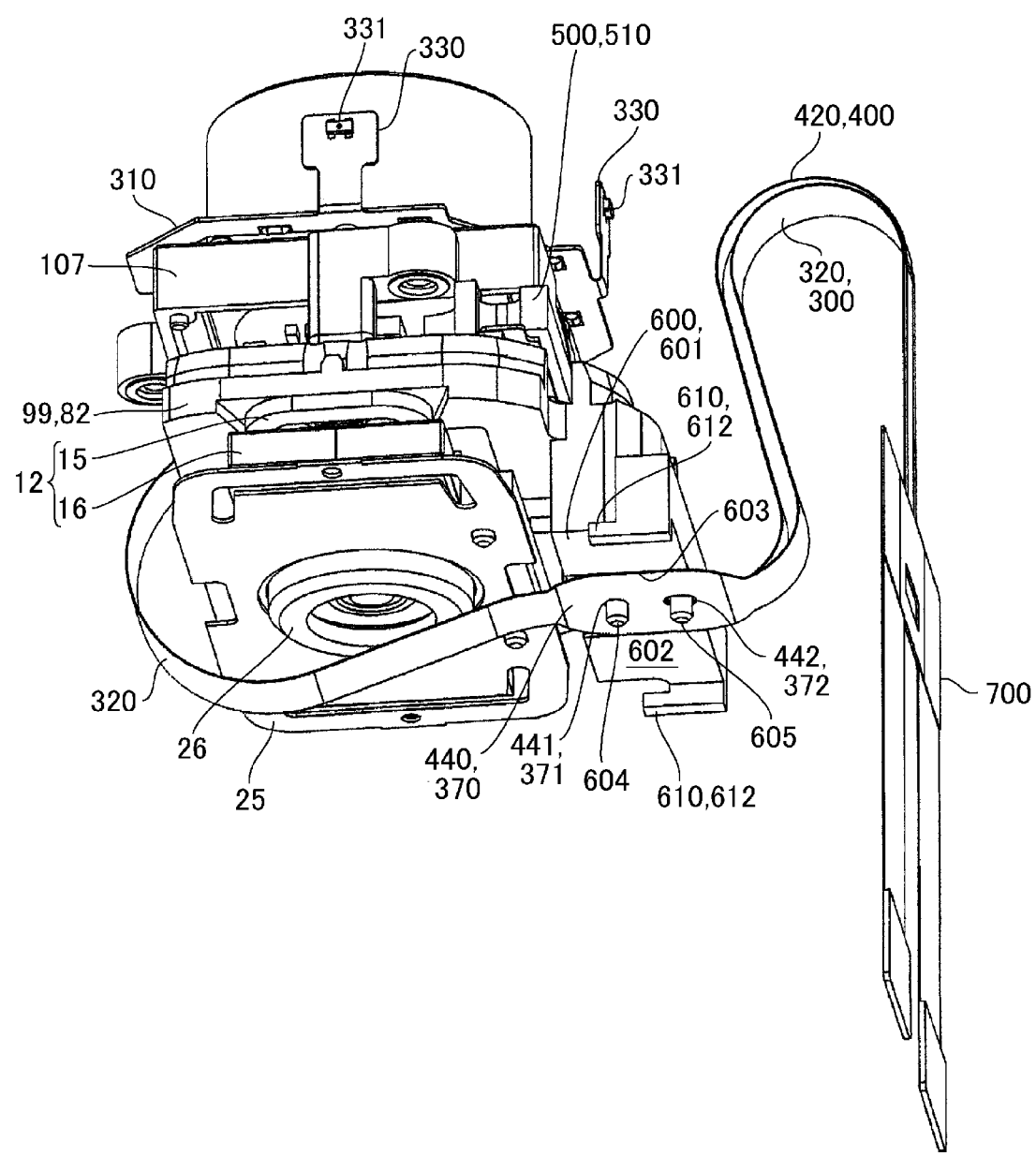
FIG. 19 is a perspective view of the second movable-member-side fixing part to which the flexible printed circuit boards are fixed.
Figure 20:
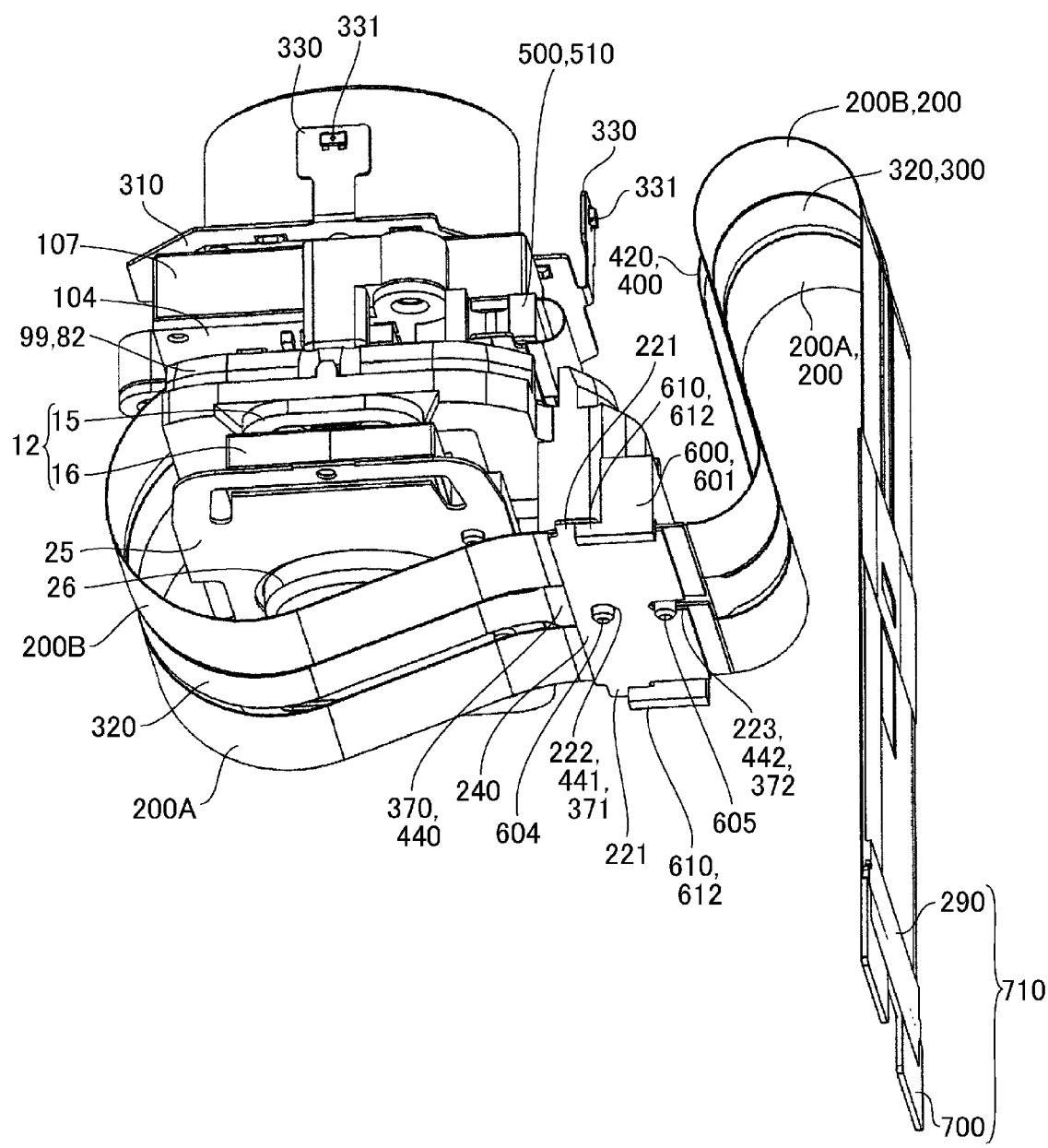
FIG. 20 is a perspective view of the second movable-member-side fixing part to which the flexible printed circuit boards are fixed.

FIG. 18 is a perspective view of the holder bottom plate member 82, when seen from the second movable-member-side fixing part 600 side. FIG. 19 is a perspective view of the second movable-member-side fixing part 600 to which the flexible printed circuit boards 300 and 400 are fixed. Further, FIG. 20 is a perspective view of the second movable-member-side fixing part 600 to which the flexible printed circuit boards 200, 300 and 400 are fixed. As shown in FIG. 18, the holder bottom plate member 82 is provided with: a bottom plate part 99, on which a shaft part 96 protruding in the −Z direction and rolling drive coil holding parts 97 are formed; and a projection part 601, which is formed on the edge of the bottom plate part 99 with respect to the +X direction. The projection part 601 is in a rectangular shape that is long in the Y axis direction and the projection part 601 protrudes from the bottom plate part 99 in the −Z direction. The second movable-member-side fixing part 600 is provided with a bottom end surface 602 of the projection part 601. On the bottom plate part 99, a concave part on which the plate-shape part 410 of the flexible printed circuit board 400 is arranged is formed around the shaft part 96. To the plate-shape part 410, coil wires of the rolling drive coils 15 held by the rolling drive coil holding part 97 are connected.

As shown in FIG. 11, the flexible substrate portion 420 of the flexible printed circuit board 400 is bent toward the −Z direction from the edge of the plate-shape part 410 with respect to the +X direction, and is drawn along the side surface with respect to the −X direction of the projection part 601 toward the second movable-member-side fixing part 600. The second movable-member-side fixing part 600 is provided with: a groove part 603, which is formed on the bottom end surface 602 of the projection part 601; two projection parts 604 and 605, each of which protrudes from the bottom surface of the groove part 603; and two third hook parts 610, which are respectively formed on both edges of the projection part 601 with respect to the Y axis direction. The projection parts 604 and 605 are in cylindrical shapes and arranged at positions apart from each other with respect to the X axis direction. The groove part 603 has width and depth that are sufficient for accommodating a layer of the fifth fixation member 440 of the flexible printed circuit board 400 and the fourth fixation member 370 of the flexible printed circuit board 300. When fixing the flexible printed circuit boards 200, 300 and 400 to the second movable-member-side fixing part 600, as shown in FIG. 19, the fifth fixation member 440 of the flexible printed circuit board 400 is arranged in the groove part 603 and then the projection parts 604 and 605 are engaged in the engagement holes 441 and 442, respectively. Then, the fourth fixation member 370 of the flexible printed circuit board 300 is overlapped with the fifth fixation member 440 and arranged in the groove part 603, so that the projection parts 604 and 605 are engaged in the engagement holes 371 and 372, respectively.

Each of the third hook parts 610 is in a bent-shape, which is provided with: a butting part 611, which is in a shape of a square pole that protrudes in the −Z direction relative to the bottom end surface 602 of the projection part 601; and a holding part 612, which protrudes in the −X direction as a bent from the tip of the butting part 611. Between the holding part 612 of each third hook part 610 and the bottom end surface 602 of the projection part 601, there is formed a space into which a hooked part 221 formed on the second stiffener plate 220 for the flexible printed circuit board 200 can be inserted.

The method for fixing the second fixation member 240 of the flexible printed circuit board 200 to the second movable-member-side fixing part 600 is substantially the same as the method for fixing the first fixation member 230 to the first movable-member-side fixing part 510. That is to say, the second stiffener plate 220 is inclined such that the edge of the second stiffener plate 220 with respect to the −X direction is kept away from the bottom end surface 602, and then the edge of the second stiffener plate 220 with respect to the +X direction is slid along the bottom end surface 602 toward the +X direction. In this way, the hooked parts 221, which are respectively provided on the both edges of the second stiffener plate 220 with respect to the width direction, are inserted between the third hook parts 610 and the bottom end surface 602 of the projection part 601, and the hooked parts 221 are held by the holding parts 612, respectively. Furthermore, the hooked parts 221 abut against the butting parts 611 of the third hook parts 610, and therefore position of the second stiffener plate 220 is determined. Furthermore, as the projection part 605 is arranged at the engagement hole 223 that is provided on the edge of the second stiffener plate 220 with respect to the +X direction, and the projection part 605 abuts against the edge of the engagement hole 223.

In the above state, when the projection part 604 is engaged in the other engagement hole 222 that is provided on the second fixation member 240, the second fixation member 240 of the flexible printed circuit board 200 is fixed to the second movable-member-side fixing part 600. Furthermore, the fifth fixation member 440 and the fourth fixation member 370, which are respectively provided on the flexible printed circuit boards 400 and 300, are held by the second fixation member 240 of the flexible printed circuit board 200.

(Flexing Structure of the Flexible Printed Circuit Boards)

As shown in FIG. 1 and FIG. 11, the flexible printed circuit boards 200, 300 and 400 are drawn out from the aperture part 62 to the outside of the fixing member 8 upon being fixed to the second movable-member-side fixing part 600. The flexible printed circuit boards 200, 300 and 400 are drawn together in the outside of the fixing member 8. In the outside of the fixing member 8, the supporting member 730 (see FIG. 11) that supports the fixing member 8 is arranged. On the supporting member 730, the supporting-member-side connector part 720, to which the common connector inserting part 710 for the flexible printed circuit boards 200, 300 and 400 can be connected and disconnected, is provided. The portions of the flexible printed circuit boards 200, 300 and 400, which are drawn between the second movable-member-side fixing part 600 and the supporting member 730, are flexed into a U-shape.

As shown in FIG. 11, in the present embodiment, the connector part 720 is arranged outside the aperture part 62, which is provided on the fixing member 8, with respect to the radial direction. Between the supporting-member-side connector part 720 and the side surface of the fixing member 8, on which the aperture part 62 is provided, there is provided a predetermined space in the radial direction. The flexible printed circuit boards 200, 300 and 400 are arranged in the space in a state of being flexed in U-shapes. The flexed shapes of the flexible printed circuit boards 200, 300 and 400 are shapes configured with: a first portion U1, which rises in the +Z direction along the side surface of the fixing member 8 upon being drawn out from the aperture part 62 to the outside of the fixing member 8; a folded portion U2, which is curved in a semicircle shape from the +Z direction to the −Z direction so as to be folded at a position with predetermined height with respect to the Z axis direction; and a second potion U3, which extends from the folded portion U2 to the −Z direction.

The flexible printed circuit board 200 includes a first flexed portion 280, which is formed between the common connector inserting part 710 and a portion (i.e., the second fixation member 240) which is fixed to the second movable-member-side fixing part 600. Similarly, the flexible printed circuit board 300 includes a second flexed portion 380, which is formed between the common connector inserting part 710 and a portion (i.e., the fourth fixation member 370) which is fixed to the second movable-member-side fixing part 600. Furthermore, the flexible printed circuit board 400 includes a third flexed portion 480, which is formed between the common connector inserting part 710 and a portion (i.e., the fifth fixation member 440) which is fixed to the second movable-member-side fixing part 600. The flexed shapes of the first flexed portion 280, the second flexed portion 380 and the third flexed portion 480 are shapes configured with the first portion U1, the folded portion U2 and the second potion U3, which have been described above.

The first flexed portion 280, the second flexed portion 380 and the third flexed portion 480 are arranged in the outside of the movable member 10 with respect to the radial direction with the center being the axis L, which is the optical axis of the optical unit 1. Therefore, when the movable member 10 rotates in the rolling direction with the center being the axis L, the first flexed portion 280, the second flexed portion 380 and the third flexed portion 480 are easily deformed between the supporting-member-side connector part 720 and the second movable-member-side fixing part 600. The first flexed portion 280, the second flexed portion 380 and the third flexed portion 480 are flexed to such an extent that prevents the flexible printed circuit boards 200, 300 and 400 from propping with respect to rotation angles that are allowed by the stopper mechanism 19, which is configured with the cutout parts 40 provided in the fixing member 8 and the projections 91 provided on the movable member 10.

Note that the flexed direction of the first flexed portion 280, the second flexed portion 380 and the third flexed portion 480 is not limited to the direction as shown in FIG. 1 and FIG. 11. For example, there may be a case of a shape formed by drawing in the −Z direction and then folding into the +Z direction, or a shape formed by drawing toward a side with respect to the radial direction and then folding into the other side with respect to the radial direction.

(Main Functional Effects of the Present Embodiment)

As described above, in the optical unit 1 of the present embodiment, the movable member 10 is provided with the holder 5, which is caused to rotate on the optical axis by the magnetic drive mechanism for rolling 12. Further, the holder 5 is provided with the second movable-member-side fixing part 600 to which the flexible printed circuit boards 200, 300 and 400 are fixed. The flexible printed circuit boards 200, 300 and 400 are provided with the common connector inserting part 710, which is connected to the supporting member 730 that supports the fixing member 8. Further, the flexed portions (i.e., the first flexed portion 280, the second flexed portion 380 and the third flexed portion 480) are formed by flexing the flexible circuit boards between the common connector inserting part 710 and the positions (i.e., the first flexed portion 280, the second flexed portion 380 and the third flexed portion 480) which are fixed to the second movable-member-side fixing part 600. Therefore, as the flexed portions become deformed between the movable member 10 and the supporting member 730 when rolling correction is preformed, it is possible to curb occurrence of reaction force, which is caused by propping of the flexible printed circuit boards 200, 300 and 400. Therefore, it is possible to curb increase in power consumption because there is no need for increasing an amount of power to be provided for the magnetic drive mechanism for rolling 12 to rotate the movable member 10 against reaction power caused by the flexible printed circuit boards 200, 300 and 400. Furthermore, it is possible to downsize the optical unit 1 because there is no need for upscaling the magnetic drive mechanism for rolling 12 with larger coils or magnets for rotating the movable member 10 against reaction power caused by the flexible printed circuit boards 200, 300 and 400.

In the present embodiment, the first flexed portion 280, the second flexed portion 380 and the third flexed portion 480 are in U-shapes. More specifically, the first flexed portion 280, the second flexed portion 380 and the third flexed portion 480 are in U-shapes that extend in a direction (i.e., Z axis direction) along the axis L and then are folded into the opposite direction. Such flexed shapes as described above enable deformation in accordance with rotation on the axis L. Therefore, when performing rolling correction, which involves rotation of the movable member 10 on the axis L, propping by the flexible printed circuit boards 200, 300 and 400 is less likely to occur.

In the present embodiment, the first flexed portion 280, the second flexed portion 380 and the third flexed portion 480 are arranged in the outside of the movable member 10 with respect to the radial direction with the center being the axis L. Therefore, as the first flexed portion 280, the second flexed portion 380 and the third flexed portion 480 become deformed in the outside of the movable member 10 with respect to the radial direction when rolling correction is performed, it follows that propping by the flexible printed circuit boards 200, 300 and 400 is less likely to occur in relation to the supporting member 730 or the fixing member 8 arranged in the outside of the movable member 10 with respect to the radial direction.

Other Embodiment (1)

Figure 21:
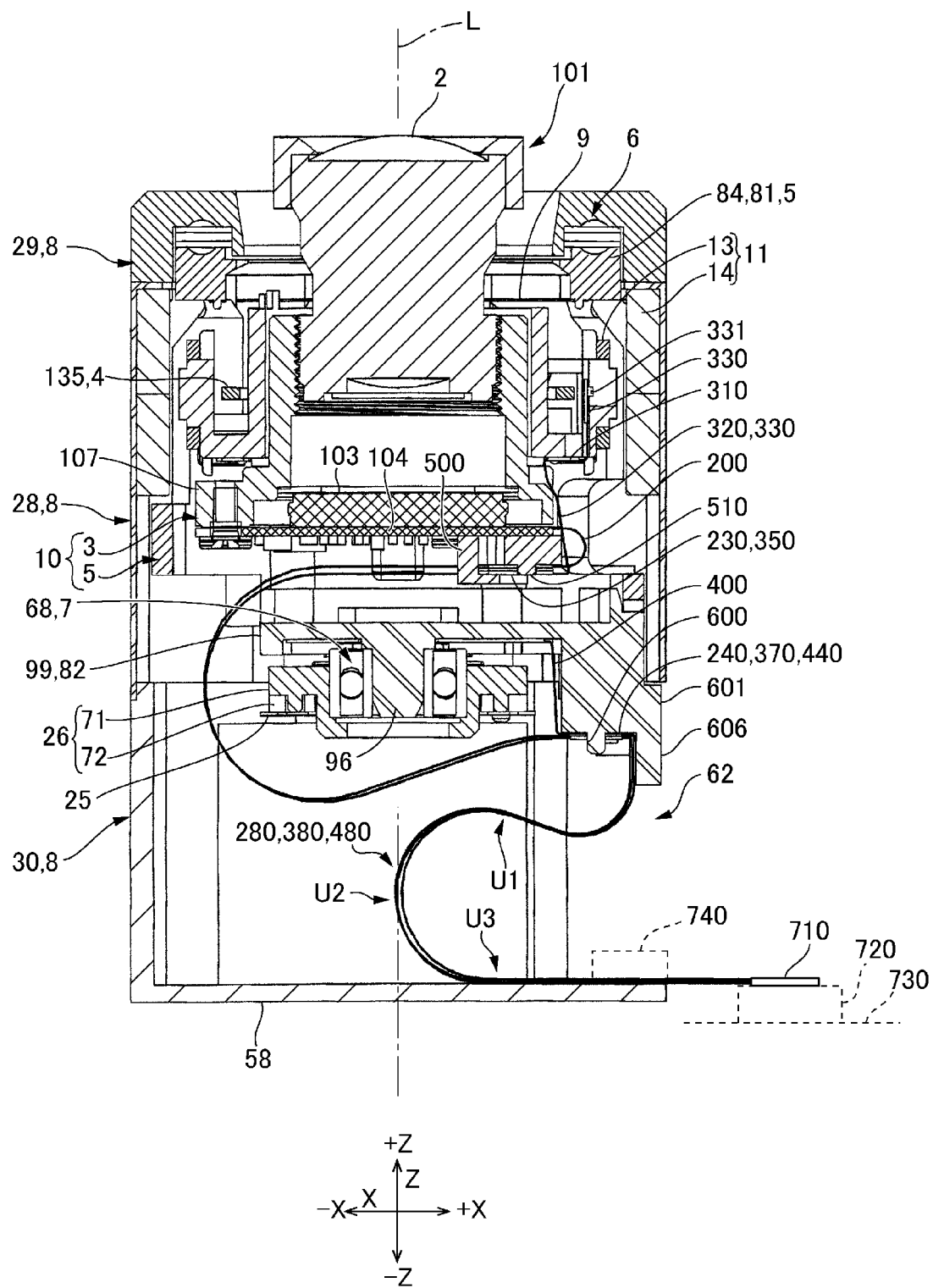
FIG. 21 is a cross-sectional view of the optical unit of another embodiment.

FIG. 21 is a cross-sectional view of the optical unit 1 of the other embodiment. The following description only explains aspects that are different from the above embodiment and omits explanation of the same aspects. As for the optical unit 1 of FIG. 21, height of the counter-object-side casing 30 with respect to the Z axis direction is higher than the above embodiment, and the space between the second movable-member-side fixing part 600 and the end plate part 58 of the counter-object-side casing 30 is larger than the above embodiment. In the embodiment of FIG. 21, the flexible printed circuit boards 200, 300 and 400 are drawn, upon being fixed to the second movable-member-side fixing part 600, in the −Z direction, which is on the image side (i.e., the counter-object side) of the movable member 10, instead of being drawn to the outside of the fixing member 8. Furthermore, on the image side of the movable member 10, the flexed shapes of the flexible printed circuit boards 200, 300 and 400 are formed between the movable member 10 and the end plate part 58.

In the embodiment of FIG. 21, the flexible printed circuit boards 200, 300 and 400 are bent in the −Z direction upon being fixed to the second movable-member-side fixing part 600. Therefore, on the edge (i.e., the edge on the external side with respect to the radial direction) with respect to the +X direction of the projection part 601, where the second movable-member-side fixing part 600 is provided, there is provided a restraint wall 606 that protrudes in the −Z direction (i.e., the image side in the axis direction). The flexible printed circuit boards 200, 300 and 400 are abutted against by the restraint wall 606 and bent in the −Z direction, and then are flexed in U-shapes between the movable member 10 and the end plate part 58. As the restraint wall 606 supports the flexible printed circuit boards 200, 300 and 400 from the external side with respect to the radial direction, it follows that excessive force is not imposed on the flexible printed circuit boards 200, 300 and 400. On the flexible printed circuit boards 200, 300 and 400, there are formed the first flexed portion 280, the second flexed portion 380 and the third flexed portion 480, respectively, which are in U-shapes opening to the external side with respect to the radial direction (i.e., +X direction in FIG. 21), in the −Z direction relative to the second movable-member-side fixing part 600, the plate spring 25 and the movable holder 26. The first flexed portion 280, the second flexed portion 380 and the third flexed portion 480 are in shapes configured with: a first portion U1, which is in the −Z direction relative to the second movable-member-side fixing part 600 and extends in the −X direction; a folded portion U2, which is curved and folded in a semicircle shape from the −X direction to the +X direction at a position on the axis L; and a second portion U3, which extends from the folded portion U2 to the +X direction.

As with the embodiment described above, there is formed a common connector inserting part 710 on the edges of the flexible printed circuit boards 200, 300 and 400. The common connector inserting part 710 is connected to a supporting-member-side connector part 720, which is provided on the supporting member 730 outside the aperture part 62 of the fixing member 8. Alternatively, as shown with a broken line in FIG. 21, it is possible that the common connector inserting part 710 is connected to a fixing-member-side connector 740, which is provided on the end plate part 58 of the fixing member 8.

As described above, in the embodiment of FIG. 21, the first flexed portion 280, the second flexed portion 380 and the third flexed portion 480 are arranged on the image side with respect to the direction of the axis L (i.e., the optical axis) relative to the movable member 10. Such flexed shapes as described above are possible in a case where the supporting-member-side connector part 720 or the fixing-member-side connector 740, to which the common connector inserting part 710 is connected, is arranged on the image side in the direction of the axis L (i.e., the optical axis) relative to the movable member 10. The flexed shapes in FIG. 21 enable deformation in accordance with rotation of the movable member 10 on the axis L. Therefore, when preforming rolling correction, which involves rotation of the movable member 10 on the axis L, propping by the flexible printed circuit boards 200, 300 and 400 is less likely to occur. Specifically, in the present embodiment, the folded portion U2 of the first flexed portion 280, the second flexed portion 380 and the third flexed portion 480 is positioned on the axis L (i.e., the optical axis). Therefore, as deformation such that the first portion U1 and the second potion U3 are oriented respectively in different directions with the center being at the folded part U2 is possible, it follows that deformation in accordance with rotation of the movable member 10 on the axis L is easily performed. Therefore, when rolling correction is performed, propping by the flexible printed circuit boards 200, 300 and 400 is less likely to occur.

(2) Although, in the above embodiment, rolling drive coils 15 of the magnetic drive mechanism for rolling 12 are mounted on the movable member 10 and rolling drive magnets 16 are provided on the fixing member 8, it is possible to adopt a configuration in which the rolling drive magnets 16 are provided on the movable member 10 and the rolling drive coils 15 are provided on the fixing member 8. In this case, there is no need to connect the flexible printed circuit board 400 to the movable member 10. Therefore, the flexible printed circuit board 400 is easily assembled and the optical unit 1 is easily manufactured. Furthermore, when the movable member 10 rotates in the rolling direction, motion of the movable member 10 is not interfered by the flexible printed circuit board 400.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correction function, the optical unit comprising:
   a movable member configured to hold an optical module;
   a rotation supporting mechanism configured to rotatably support the movable member on an optical axis;
   a fixing member configured to support the movable member via the rotation supporting mechanism;
   a rolling magnetic driving mechanism configured to rotate the movable member on the optical axis; and
   an optical module flexible printed circuit board which is connected to the optical module,
   wherein the movable member comprises a holder configured to rotate on the optical axis while holding the optical module,
   wherein the holder comprises a movable-member-side fixing part to which the optical module flexible printed circuit board is fixed,
   wherein the optical module flexible printed circuit board comprises:

a connector inserting part which is connected to the fixing member or to a supporting member that supports the fixing member; and a flexed part which is formed between the connector inserting part and a first fixed portion that is fixed to the movable-member-side fixing part, wherein the first fixed portion that is fixed to the movable-member-side fixing part is a part of the optical module flexible printed circuit board and one end of the optical module flexible printed circuit board is connected to the optical module, and a middle part of the optical module flexible printed circuit board is fixed to the first fixed portion on the movable-member-side fixing part, and wherein the rolling magnetic driving mechanism comprises:

a coil that is fixed to the movable member; and a magnet that is fixed to the fixing member, wherein a rolling flexible printed circuit board is connected to the coil, and wherein the rolling flexible printed circuit board comprises another flexed part which is formed between a second fixed portion of the rolling flexible printed circuit board that is fixed to the movable-member-side fixing part and third fixed portion of the rolling flexible printed circuit board that is fixed to the fixing member or to the supporting member.

2. The optical unit with shake correction function according to claim 1, wherein the movable member comprises a swing magnetic driving mechanism configured to swing the optical module on an axis crossing the optical axis, wherein a swing flexible printed circuit board is connected to the swing magnetic driving mechanism, and wherein the swing flexible printed circuit board comprises a second flexed part which is formed between a fourth fixed portion of the swing flexible printed circuit board that is fixed to the movable-member-side fixing part and a fifth fixed portion of the swing flexible printed circuit board that is fixed to the fixing member or to the supporting member.

3. The optical unit with shake correction function according to claim 1, wherein the flexed part is in a U-shape.

4. The optical unit with shake correction function according to claim 1, wherein the flexed part is arranged to be on an outer side of the movable member in a radial direction whose center is the optical axis.

5. The optical unit with shake correction function according to claim 1, wherein the flexed part is arranged to be on an image side in a direction of the optical axis relative to the movable member.

6. The optical unit with shake correction function according to claim 5, wherein the flexed part is in a U-shape that is open toward an outer side in a radial direction and includes a folded part arranged on the optical axis.

7. The optical unit with shake correction function according to claim 5, wherein the holder includes a restraint wall that protrudes toward the image side in the direction of the optical axis, the restraint wall being on an outer side of the movable-member-side fixing part in a radial direction.

* * * * *